United States Patent
Park et al.

(10) Patent No.: US 9,930,515 B2
(45) Date of Patent: Mar. 27, 2018

(54) METHOD FOR DETECTING DISCOVERY SIGNAL IN WIRELESS COMMUNICATION SYSTEM, AND DEVICE FOR SAME

(71) Applicant: LG ELECTRONICS INC., Seoul (KR)

(72) Inventors: Jonghyun Park, Seoul (KR); Yunjung Yi, Seoul (KR); Bonghoe Kim, Seoul (KR); Kijun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/311,498

(22) PCT Filed: May 13, 2015

(86) PCT No.: PCT/KR2015/004790
§ 371 (c)(1),
(2) Date: Nov. 15, 2016

(87) PCT Pub. No.: WO2015/174731
PCT Pub. Date: Nov. 19, 2015

(65) Prior Publication Data
US 2017/0105112 A1    Apr. 13, 2017

Related U.S. Application Data

(60) Provisional application No. 61/994,103, filed on May 15, 2014.

(51) Int. Cl.
*H04W 8/00* (2009.01)
*H04L 5/00* (2006.01)

(52) U.S. Cl.
CPC ........... *H04W 8/005* (2013.01); *H04L 5/0048* (2013.01)

(58) Field of Classification Search
CPC ............................ H04W 8/005; H04L 5/0048
See application file for complete search history.

(56) References Cited

U.S. PATENT DOCUMENTS

| | | | |
|---|---|---|---|
| 2014/0092826 A1 | 4/2014 | Eriksson et al. | |
| 2014/0301301 A1* | 10/2014 | Cheng | H04L 5/0048 370/329 |
| 2014/0314000 A1* | 10/2014 | Liu | H04W 72/042 370/329 |

FOREIGN PATENT DOCUMENTS

| WO | 2013129837 | 9/2013 |
|---|---|---|
| WO | 2014069937 | 5/2014 |

OTHER PUBLICATIONS

PCT International Application No. PCT/KR2015/004790, International Search Report dated Feb. 28, 2014, 2 pages.
(Continued)

*Primary Examiner* — Joseph Dean, Jr.
(74) *Attorney, Agent, or Firm* — Lee Hong Degerman Kang Waimey

(57) ABSTRACT

A method for detecting a discovery signal in a wireless communication system and a device for same are disclosed. In particular, the method whereby a terminal receives a discovery signal in a wireless communication system comprises the steps of: receiving discovery quasi co-located (QCL) type configuration information for configuring a discovery QCL type; detecting a synchronization signal and obtaining a first scrambling identity (SCID); and detecting the discovery signal by using the first SCID on the basis of the configured discovery QCL type, wherein a QCL relationship between an antenna port for the discovery signal and an antenna port for the synchronization signal can be established in relation to a large-scale channel property according to the discovery QCL type.

15 Claims, 17 Drawing Sheets

(56) References Cited

OTHER PUBLICATIONS

LG Electronics, "Discussions on small cell discovery signal design", R1-140319, 3GPP TSG RAN WG1 Meeting #76, Feb. 2014, 8 pages.

NTT Docomo, "Views on discovery signal design for Rel-12 small cell enhancement", R1-140622, 3GPP TSG RAN WG1 Meeting #76, Feb. 2013, 7 pages.

* cited by examiner

[FIG. 1]
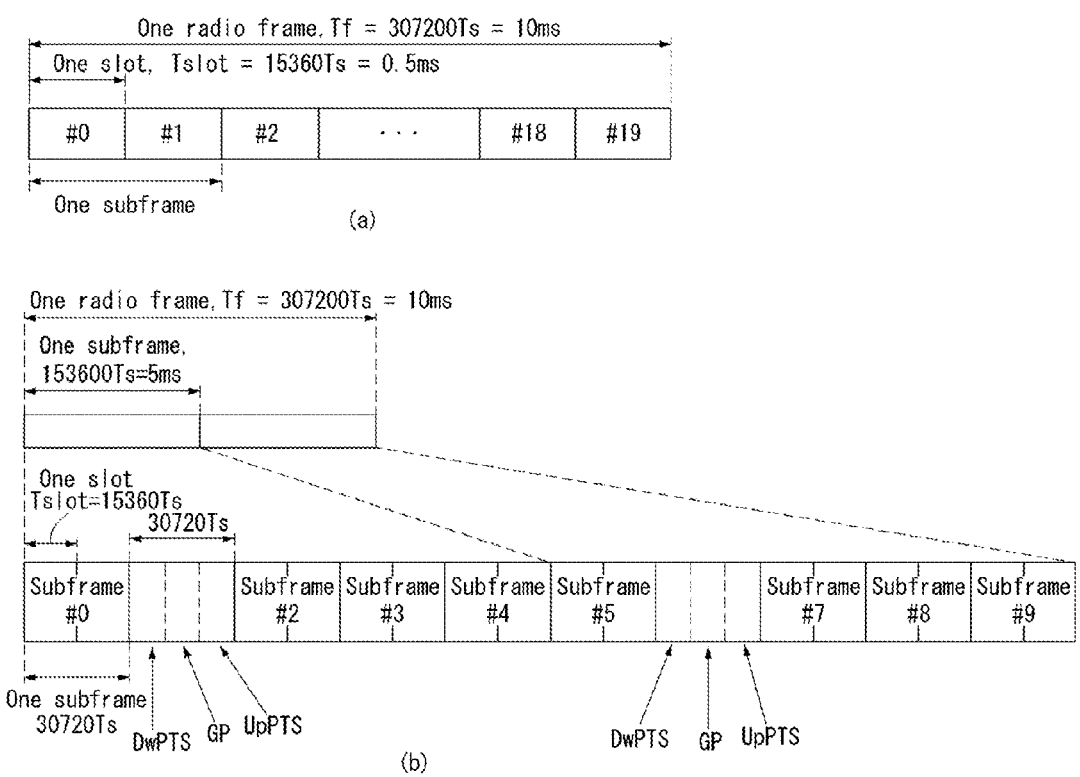

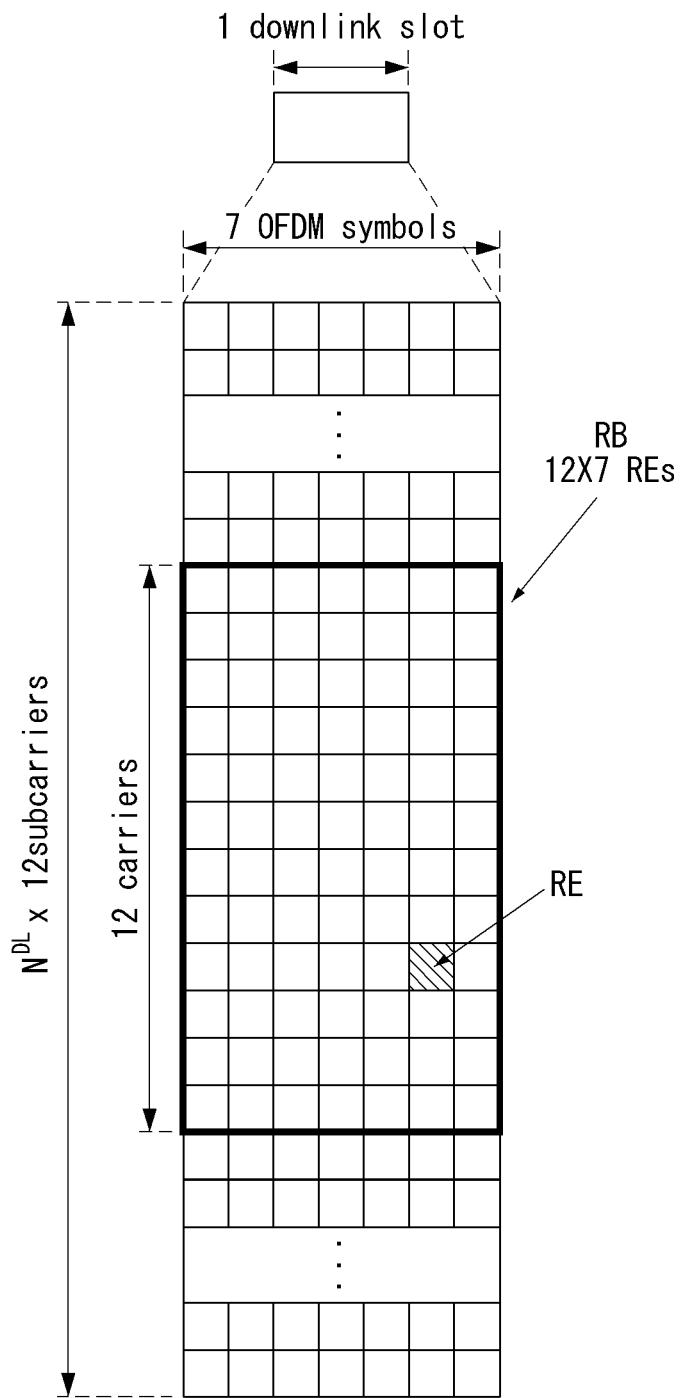
[FIG. 2]

[FIG. 3]
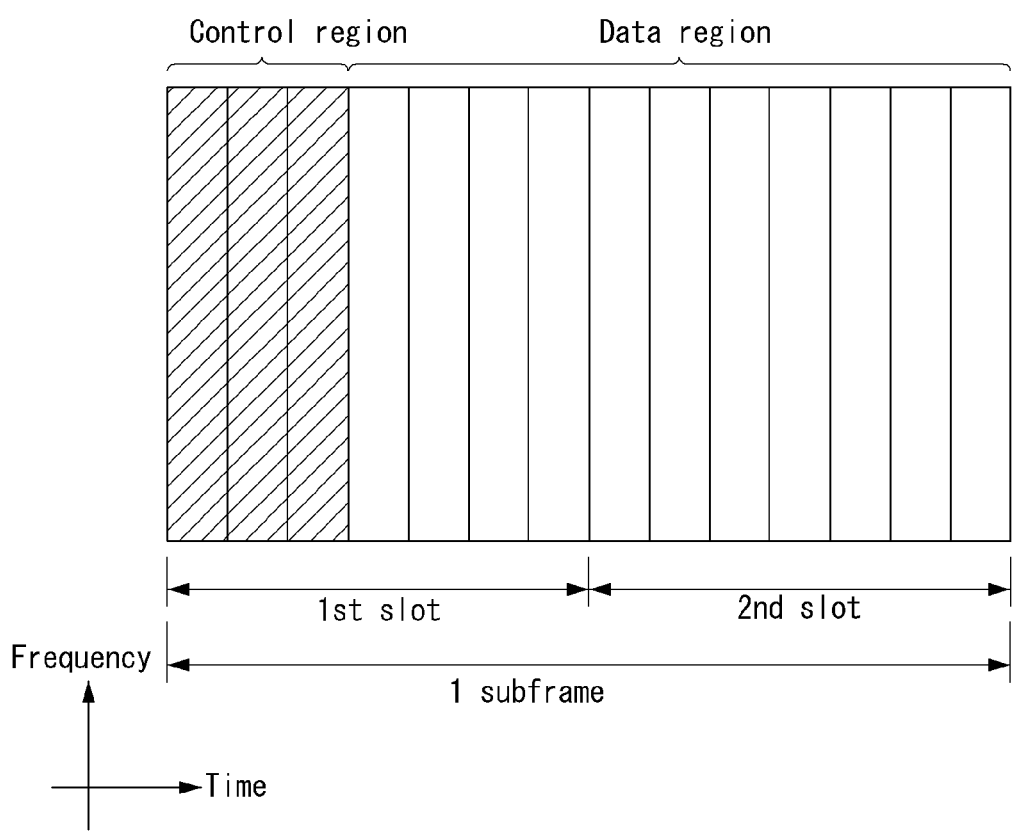

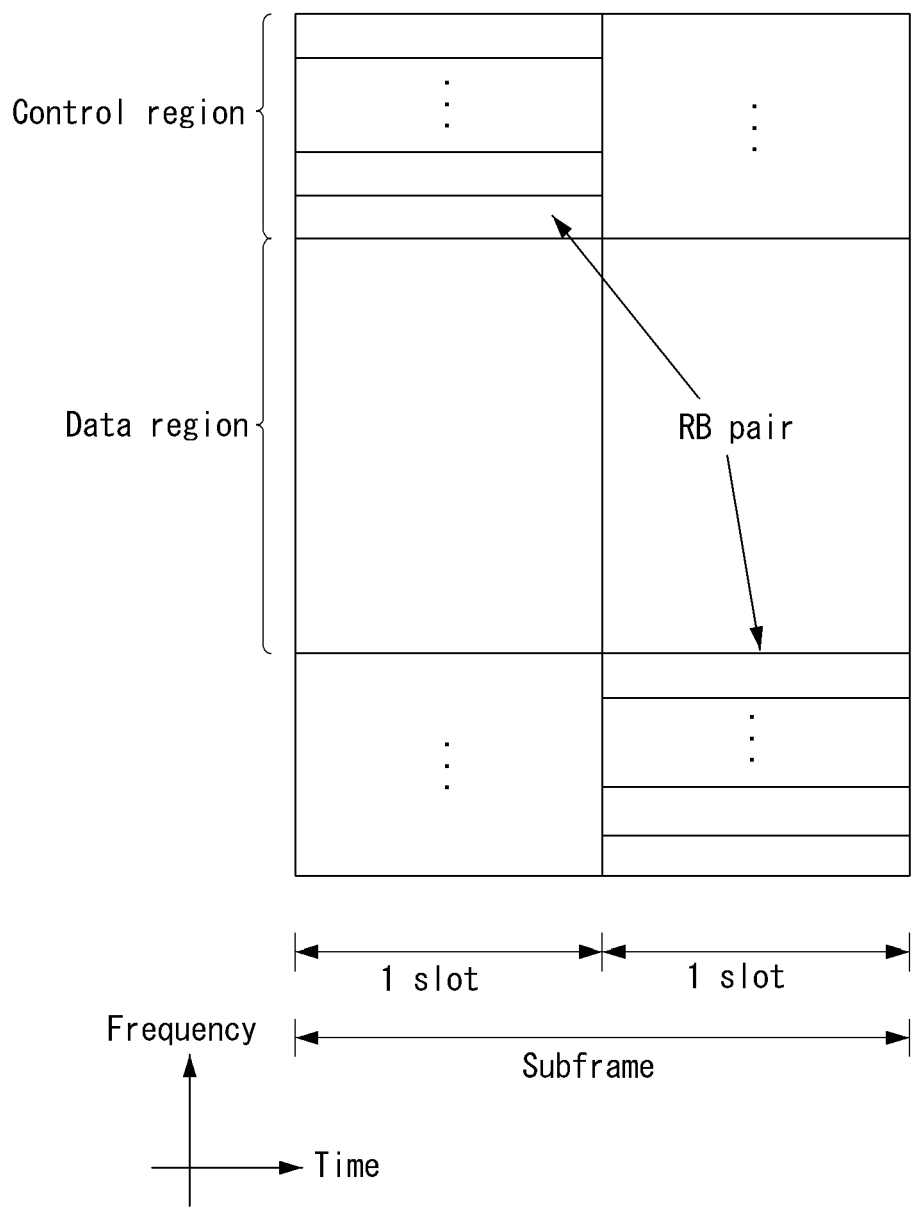
[FIG. 4]

【FIG. 5】
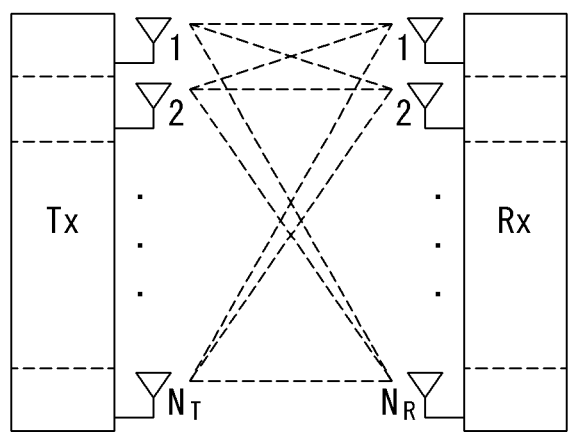
【FIG. 6】
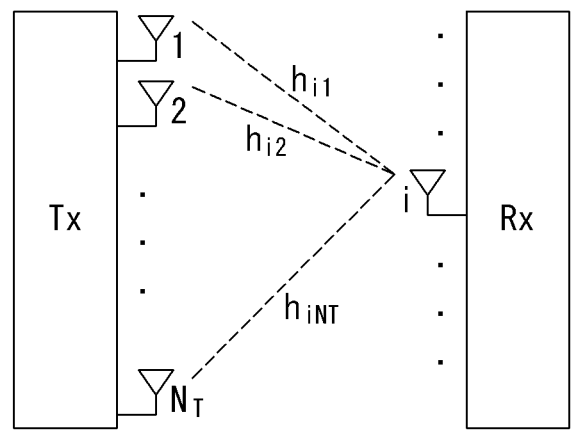

[FIG. 7]
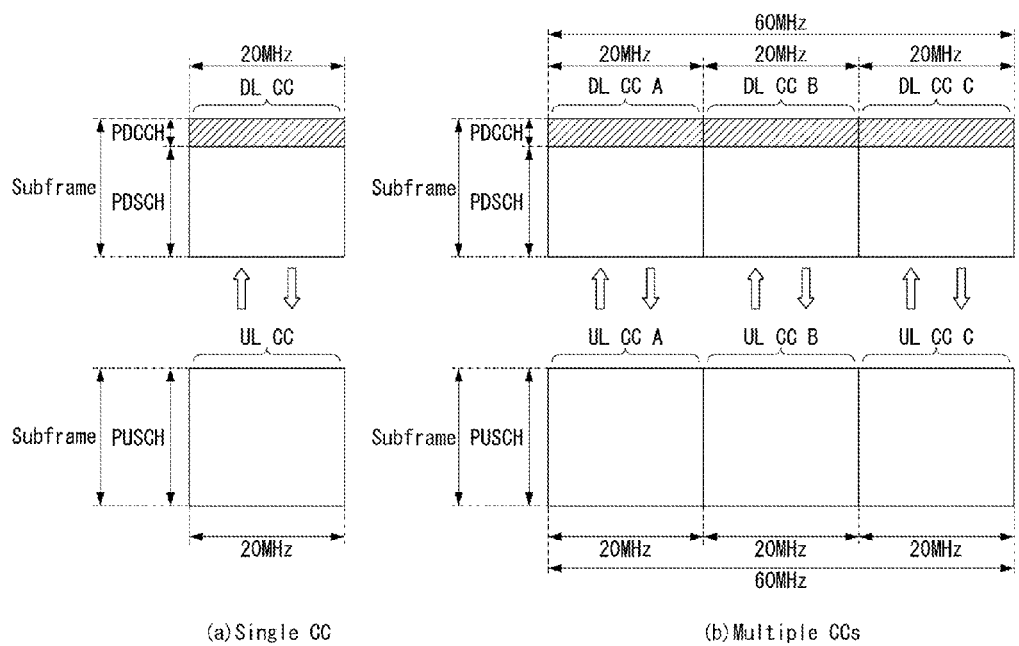

[FIG. 8]
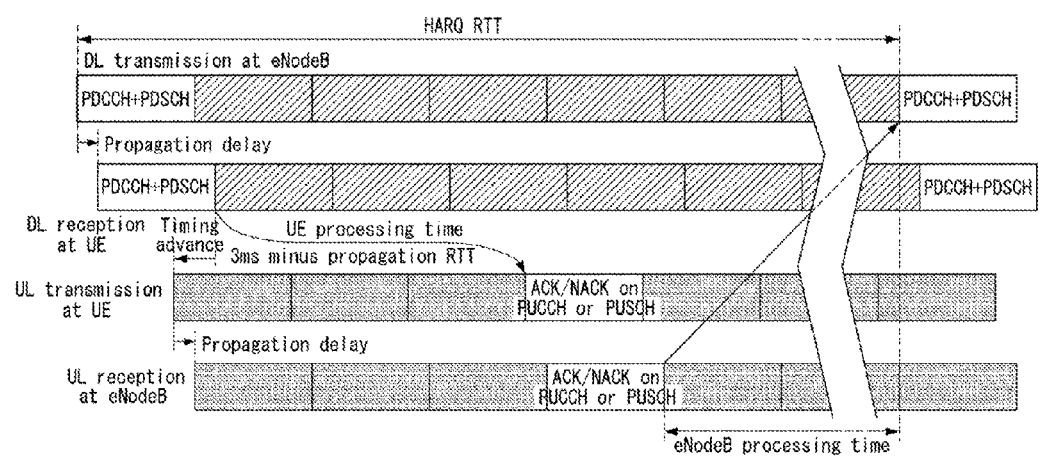

[FIG. 9]
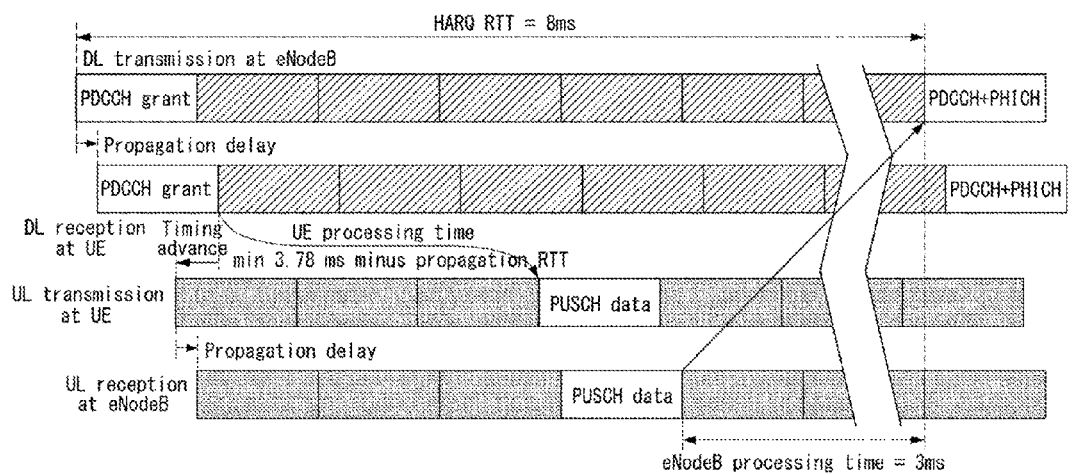

[FIG. 10]
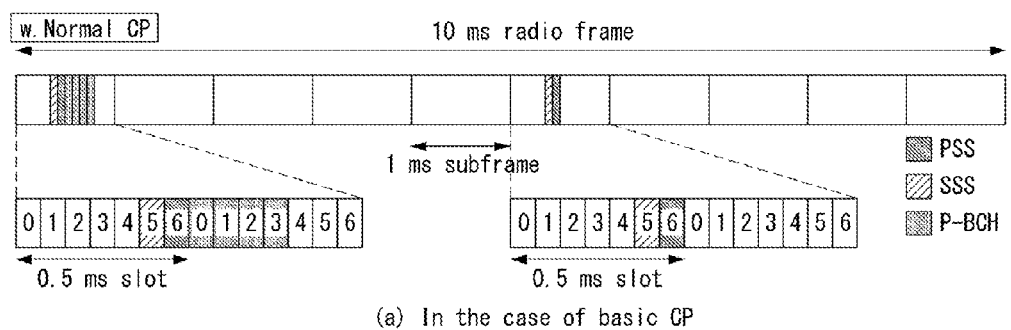
(a) In the case of basic CP
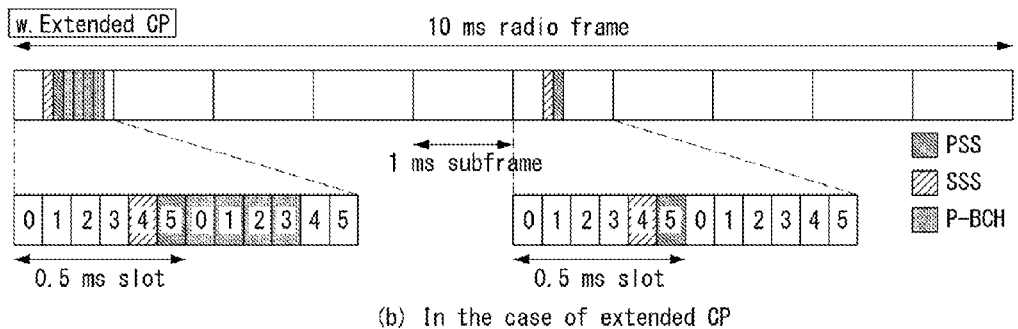
(b) In the case of extended CP

[FIG. 11]
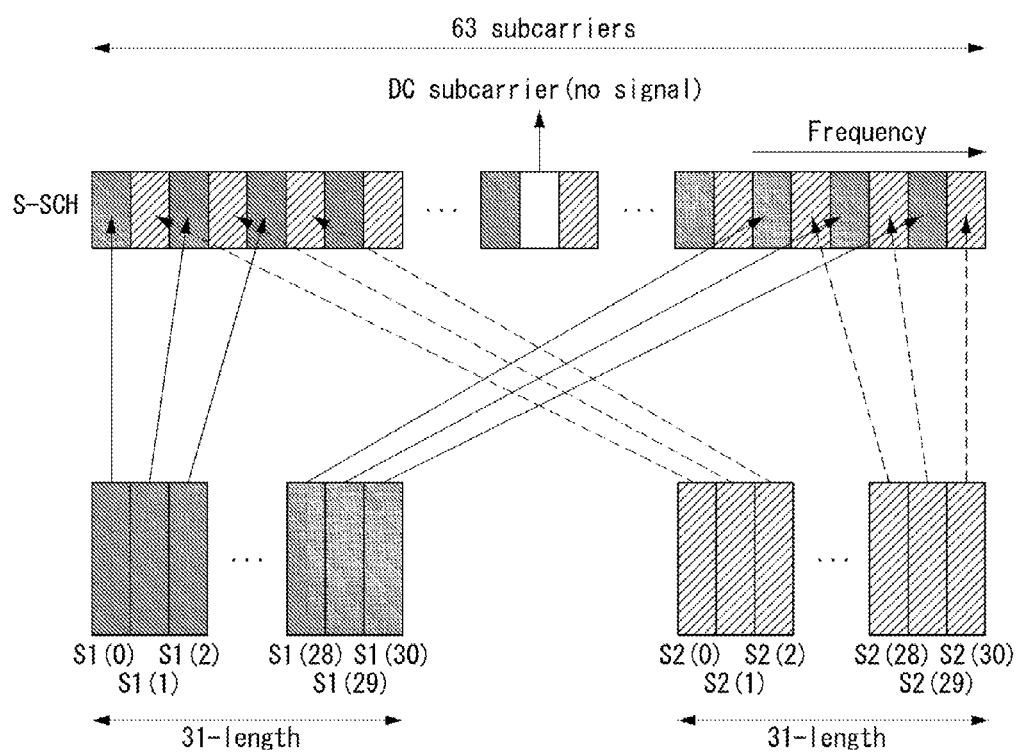

[FIG. 12]
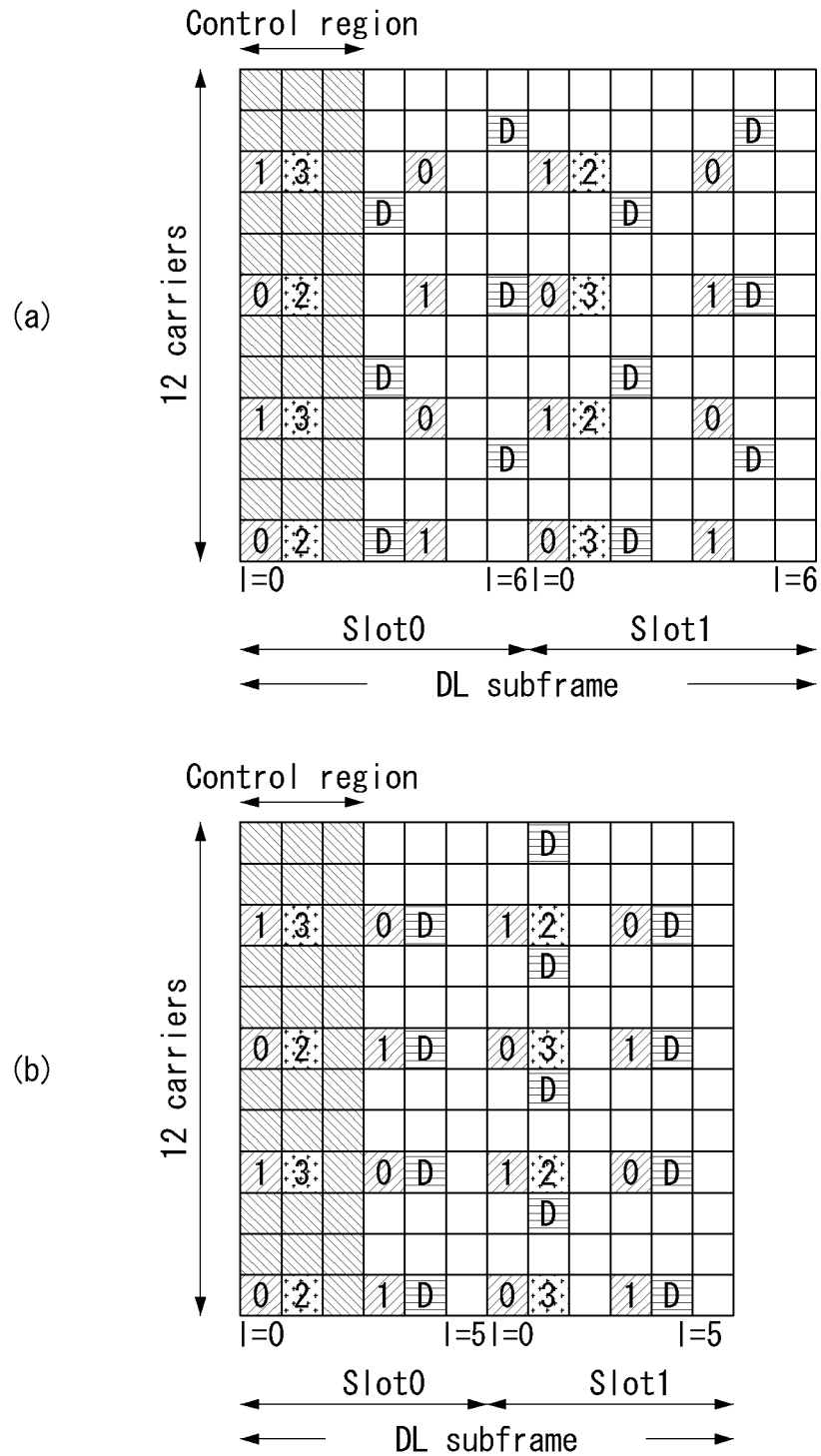

[FIG. 13]
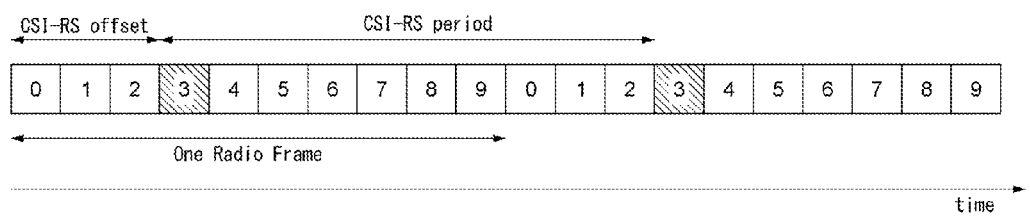

【FIG. 14】
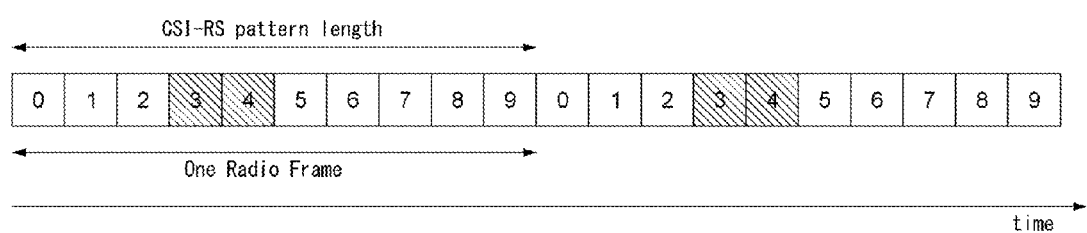

[FIG. 15]
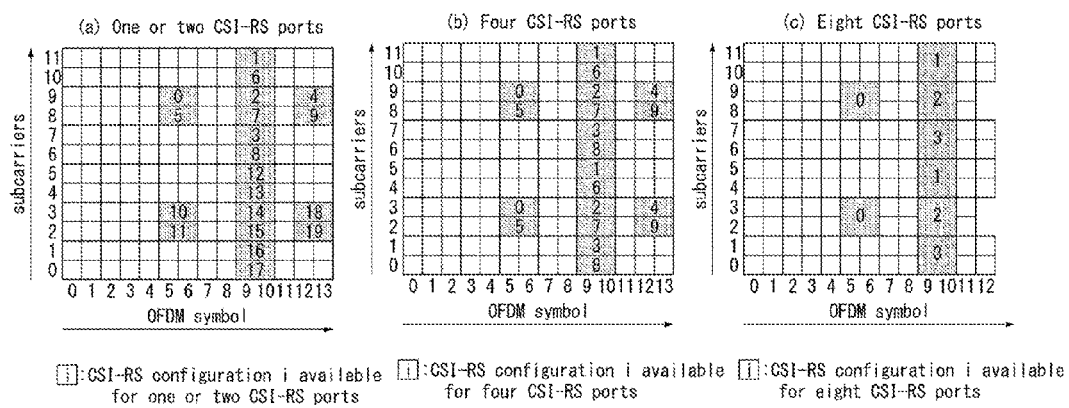

[FIG. 16]
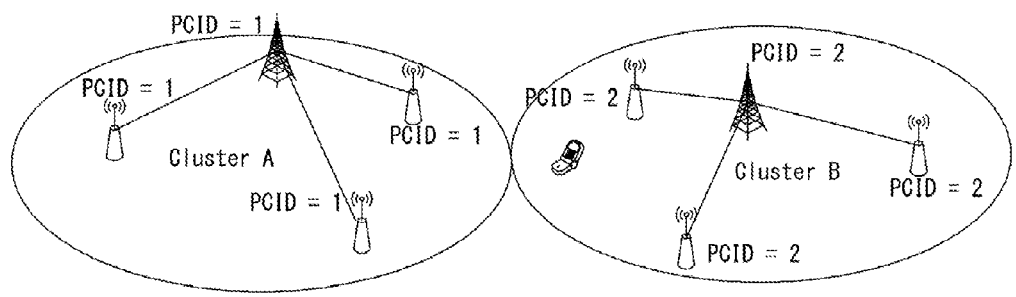

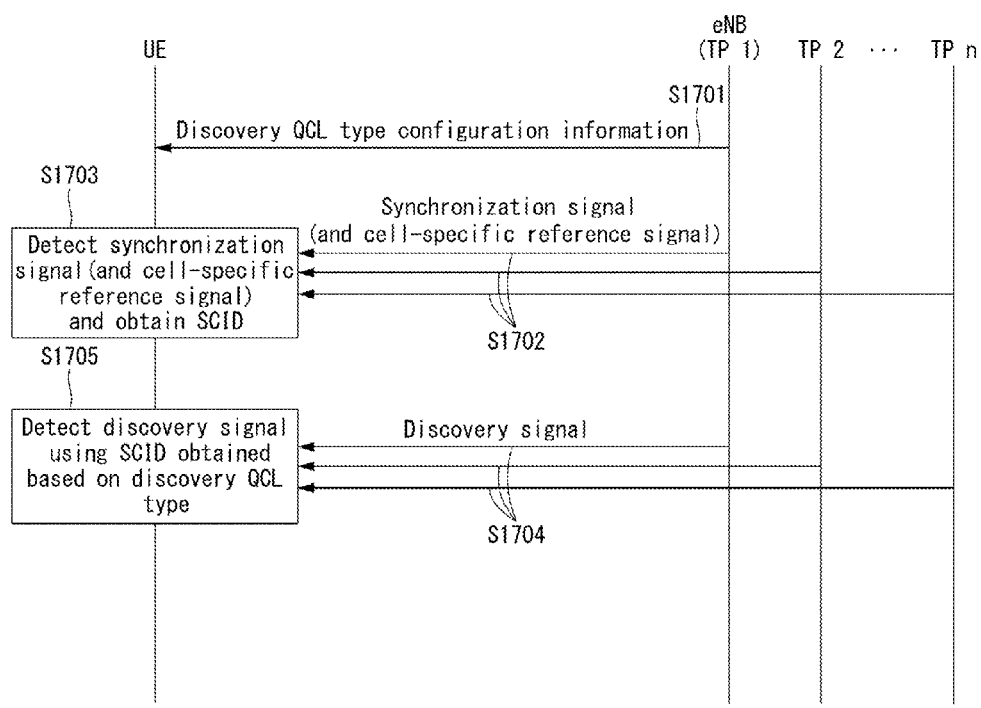

【FIG. 18】
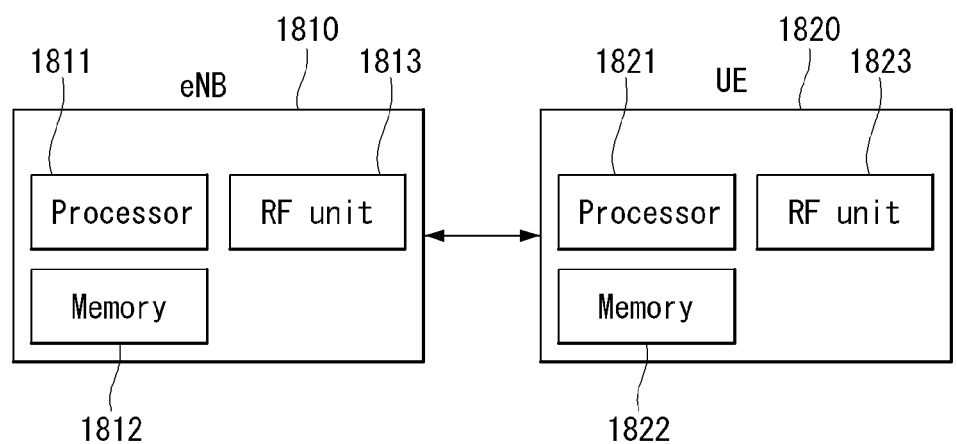

METHOD FOR DETECTING DISCOVERY SIGNAL IN WIRELESS COMMUNICATION SYSTEM, AND DEVICE FOR SAME

CROSS-REFERENCE TO RELATED APPLICATIONS

This application is the National Stage filing under 35 U.S.C. 371 of International Application No. PCT/KR2015/004790, filed on May 13, 2015, which claims the benefit of U.S. Provisional Application No. 61/994,103, filed on May 15, 2014, the contents of which are all hereby incorporated by reference herein in their entirety.

TECHNICAL FIELD

The present invention relates to a wireless communication system and, more particularly, to a method for receiving a discovery signal in a wireless communication system and a device supporting the same.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed service, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

In a small cell enhancement technology, a small cell on/off mechanism is supported to reduce energy of a small cell and interference with a neighbor cell. A small cell periodically broadcasts a discovery signal regardless of the on/off state so that the small cell can be identified or the state of the small cell can be determined by a terminal. In this case, in order for the terminal to detect the discovery signal, a quasi co-located (QCL) relation between the discovery signal and a synchronization signal and/or a cell-specific reference signal transmitted by the small cell needs to be applied, but the QCL relation has not yet been defined.

An object of the present invention proposes a method for configuring, by a terminal, a QCL relation between a synchronization signal and/or a cell-specific reference signal and a discovery signal and a method for detecting a discovery signal in accordance with the method.

Another object of the present invention proposes a method for configuring a QCL relation related to a downlink data channel based on a QCL relation configured in relation to a discovery signal.

Technical objects to be achieved by the present invention are not limited to the aforementioned objects, and those skilled in the art to which the present invention pertains may evidently understand other technical objects from the following description.

Technical Solution

In an aspect of the present invention, a method for receiving or detecting, by user equipment, a discovery signal in a wireless communication system includes receiving discovery QCL type configuration information for configuring a discovery quasi co-located (QCL) type, obtaining a first scrambling identity (SCID) by detecting a synchronization signal, and detecting the discovery signal using the first SCID based on the configured discovery QCL type. A QCL relation may be configured between an antenna port for the discovery signal and an antenna port for the synchronization signal with respect to a large-scale channel property based on the discovery QCL type.

In another aspect of the present invention, user equipment receiving a discovery signal in a wireless communication system includes a radio frequency (RF) unit transceiving a radio signal and a processor controlling the user equipment. The processor may be configured to receive discovery QCL type configuration information for configuring a discovery quasi co-located (QCL) type, obtain a first scrambling identity (SCID) by detecting a synchronization signal, and detect the discovery signal using the first SCID based on the configured discovery QCL type. A QCL relation may be configured between an antenna port for the discovery signal and an antenna port for the synchronization signal with respect to a large-scale channel property based on the discovery QCL type.

If the first discovery QCL type is configured based on the discovery QCL type configuration information, the user equipment may assume that the antenna port for the discovery signal which is generated with a second SCID identical with the first SCID or mapped in a one-to-one manner and the antenna port for the synchronization signal are quasi co-located (QCL).

The user equipment may detect the discovery signal generated with the second SCID which is identical with the first SCID or mapped in a one-to-one manner.

The large-scale channel property may include any one of {Doppler shift, average delay} and {delay spread, Doppler spread, Doppler shift, average delay}.

The user equipment may assume that the antenna port for the synchronization signal and an antenna port for a cell-specific reference signal are quasi co-located (QCL) with respect to Doppler shift and average delay.

The user equipment may assume that all of an antenna port for a cell-specific reference signal, an antenna port for a demodulation reference signal, and an antenna port for a channel state information reference signal are quasi co-located (QCL).

If a second discovery QCL type is configured based on the discovery QCL type configuration information, the user equipment may assume that the antenna port for the discovery signal which is generated with one or more second SCIDs mapped to the first SCID and the antenna port for the synchronization signal are quasi co-located (QCL).

The user equipment may detect the discovery signal generated with the one or more second SCIDs mapped to the first SCID.

The mapping between the first SCID and the second SCIDs may be configured by a network or may be implicitly determined by a predetermined function or table.

The large-scale channel property may include any one of {average delay}, {average delay, Doppler shift}, and {average delay, Doppler shift, Doppler spread}.

The user equipment may assume that the antenna port for the synchronization signal and an antenna port for a cell-specific reference signal are quasi co-located (QCL) with respect to Doppler shift and average delay.

If the user equipment supports a coordinated multi-point transmission and reception (COMP) operation, the user equipment may assume that an antenna port for a channel state information reference signal indicated by a higher layer and an antenna port for a demodulation reference signal parameter are quasi co-located (QCL).

If physical downlink shared channel (PDSCH) transmission mode based on a demodulation reference signal (DMRS) has been configured in the user equipment, the user equipment may assume that an antenna port for a channel state information reference signal and an antenna port for the DMRS are quasi co-located (QCL).

If physical downlink shared channel (PDSCH) transmission mode based on a cell-specific reference signal (CRS) has been configured in the user equipment, the user equipment may assume that an antenna port for the CRS and antenna ports for a channel state information reference signal and a demodulation reference signal are not quasi co-located (QCL).

Advantageous Effects

In accordance with an embodiment of the present invention, detection performance of a discovery signal by UE can be enhanced by configuring a QCL relation related to the discovery signal in a wireless communication system.

Furthermore, measurement accuracy based on the discovery signal of UE can be improved by configuring a QCL relation related to the discovery signal in a wireless communication system.

Furthermore, UE can receive a downlink data channel more rapidly and smoothly by configuring a QCL relation related to the downlink data channel based on the QCL relation related to a discovery signal in a wireless communication system.

Advantages which may be obtained by the present invention are not limited to the aforementioned advantages, and various other advantages may be evidently understood by those skilled in the art to which the present invention pertains from the following description.

DESCRIPTION OF DRAWINGS

The accompanying drawings, which are included herein as a part of a description in order to help understanding of the present invention, provide embodiments of the present invention, and describe the technical features of the present invention with the description below.

FIG. 1 illustrates the structure of a radio frame in a wireless communication system to which an embodiment of the present invention may be applied.

FIG. 2 is a diagram illustrating a resource grid for a downlink slot in a wireless communication system to which an embodiment of the present invention may be applied.

FIG. 3 illustrates the structure of a downlink subframe in a wireless communication system to which an embodiment of the present invention may be applied.

FIG. 4 illustrates the structure of an uplink subframe in a wireless communication system to which an embodiment of the present invention may be applied.

FIG. 5 shows the configuration of a known MIMO communication system.

FIG. 6 is a diagram showing a channel from a plurality of transmission antennas to a single reception antenna.

FIG. 7 shows an example of component carriers and a carrier aggregation in a wireless communication system to which an embodiment of the present invention may be applied.

FIG. 8 is a diagram illustrating a downlink HARQ process in an LTE FDD system

FIG. 9 is a diagram illustrating an uplink HARQ process in an LTE FDD system.

FIG. 10 illustrates a radio frame structure for transmitting a synchronization signal (SS) in a wireless communication system to which an embodiment of the present invention may be applied.

FIG. 11 illustrates a structure in which two sequences for generating a secondary synchronization signal are mapped in a physical region with being interleaved.

FIG. 12 illustrates a reference signal pattern mapped to a pair of downlink resource blocks in a wireless communication system to which an embodiment of the present invention may be applied.

FIG. 13 illustrates a periodic transmission scheme of a CSI-RS in a wireless communication system to which an embodiment of the present invention may be applied.

FIG. 14 illustrates an aperiodic transmission scheme of a CSI-RS in a wireless communication system to which an embodiment of the present invention may be applied.

FIG. 15 is a diagram illustrating the configuration of a CSI-RS in a wireless communication system to which an embodiment of the present invention may be applied.

FIG. 16 is a diagram illustrating a small cell cluster/group to which an embodiment of the present invention may be applied.

FIG. 17 is a diagram illustrating a method for detecting a discovery signal in accordance with an embodiment of the present invention.

FIG. 18 illustrates a block diagram of a wireless communication device according to an embodiment of the present invention.

MODE FOR INVENTION

Some embodiments of the present invention are described in detail with reference to the accompanying drawings. A detailed description to be disclosed along with the accompanying drawings is intended to describe some exemplary embodiments of the present invention and is not intended to describe a sole embodiment of the present invention. The following detailed description includes more details in order to provide full understanding of the present invention. However, those skilled in the art will understand that the present invention may be implemented without such more details.

In some cases, in order to avoid making the concept of the present invention vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which an Embodiment of the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

FIG. 1(a) illustrates the radio frame structure type 1. A radio frame consists of 10 subframes. One subframe consists of 2 slots in a time domain. The time taken to send one subframe is called a Transmission Time Interval (TTI). For example, one subframe may have a length of 1 ms, and one slot may have a length of 0.5 ms.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) illustrates the frame structure type 2. The radio frame structure type 2 consists of 2 half frames. Each of the half frames consists of 5 subframes, a Downlink Pilot Time Slot (DwPTS), a Guard Period (GP), and an Uplink Pilot Time Slot (UpPTS). One subframe consists of 2 slots. The DwPTS is used for initial cell search, synchronization, or channel estimation in UE. The UpPTS is used for channel estimation in an eNB and to perform uplink transmission synchronization with UE. The guard period is an interval in which interference generated in uplink due to the multi-path delay of a downlink signal between uplink and downlink is removed.

In the frame structure type 2 of a TDD system, an uplink-downlink configuration is a rule indicating whether uplink and downlink are allocated (or reserved) to all subframes. Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms  | D | S | U | U | U | D | S | U | U | U |
| 1 | 5 ms  | D | S | U | U | D | D | S | U | U | D |
| 2 | 5 ms  | D | S | U | D | D | D | S | U | D | D |
| 3 | 10 ms | D | S | U | U | U | D | D | D | U | D |
| 4 | 10 ms | D | S | U | U | D | D | D | D | D | D |
| 5 | 10 ms | D | S | U | D | D | D | D | D | D | D |
| 6 | 5 ms  | D | S | U | U | U | D | S | U | D | D |

Referring to Table 1, in each subframe of the radio frame, "D" is indicative of a subframe for downlink transmission, "U" is indicative of a subframe for uplink transmission, and "S" is indicative of a special subframe including three types of a DwPTS, GP, and UpPTS. An uplink-downlink configuration may be classified into 7 types. The positions and/or number of downlink subframes, special subframes, and uplink subframe are different in each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all pieces of UE within a cell through a broadcast channel as broadcasting information.

The structure of a radio frame is only one example. The number of subcarriers included in a radio frame or the number of slots included in a subframe and the number of OFDM symbols included in a slot may be changed in various ways.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs NDL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna."

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

The multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment Ri by a maximum transfer rate Ro if one antenna is used.

$$R_i = \min(N_T, N_R) \quad \text{[Equation 1]}$$

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and N_R reception antennas are present.

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T \quad \text{[Equation 2]}$$

Transmission power may be different in each of pieces of transmission information s1, s2, . . . sNT. In this case, if pieces of transmission power are P1, P2, . . . , PNT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In Equation 3, ŝ may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

The information vectors ŝ having controlled transmission power is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, wij denotes weight between an i-th transmission antenna and a j-th transmission information, and W is an expression of a matrix of the weight. Such a matrix W is called a weight matrix or precoding matrix.

The transmission signal x, such as that described above, may be taken into consideration to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y1, y2, . . . , yNR of the respective antennas are represented as follows using a vector y.

$$y = [y_1, y_2, \ldots, y_{N_R}]^T \quad \text{[Equation 6]}$$

Meanwhile, if channels in a multi-input/output antenna communication system are modeled, the channels may be classified according to transmission/reception antenna indices. A channel passing through a reception antenna i from a transmission antenna j is represented as hij. In this case, it is to be noted that in order of the index of hij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \quad \text{[Equation 7]}$$

Furthermore, if all channels from the N_T transmission antenna to N_R reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \quad \text{[Equation 8]}$$

Additive White Gaussian Noise (AWGN) is added to an actual channel after the actual channel experiences the channel matrix H. Accordingly, AWGN n_1, n_2, n_NR added to the N_R reception antennas, respectively, are represented using a vector as follows.

$$n = [n_1, n_2, \ldots, n_{N_R}]^T \quad \text{[Equation 9]}$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & \ddots & \\ h_{N_R 1} & h_{N_R 2} & \cdots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \quad \text{[Equation 10]}$$

$$Hx + n$$

The number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \quad \text{[Equation 11]}$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel. In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

General Carrier Aggregation

A communication environment taken into consideration in embodiments of the present invention includes a multi-carrier support environment. That is, a multi-carrier system or Carrier Aggregation (CA) system that is used in an embodiment of the present invention refers to a system in which one or more Component Carriers (CCs) having a smaller bandwidth than a target bandwidth are aggregated and used when the target wideband is configured in order to support a wideband.

In an embodiment of the present invention, a multi-carrier means of an aggregation of carriers (or a carrier aggregation). In this case, an aggregation of carriers means both an aggregation between contiguous carriers and an aggregation between discontiguous (or non-contiguous) carriers. Furthermore, the number of CCs aggregated between downlink and uplink may be different. A case where the number of downlink CCs (hereinafter called "DL CCs") and the number of uplink CCs (hereinafter called "UL CCs") are the same is called a symmetric aggregation. A case where the number of DL CCs is different from the number of UL CCs is called an asymmetric aggregation. Such the term of a carrier aggregation may be replaced with terms, such as a carrier aggregation, bandwidth aggregation, or spectrum aggregation.

An object of a carrier aggregation configured by aggregating two or more component carriers is to support up to a 100 MHz bandwidth in an LTE-A system. When one or more carriers having a smaller bandwidth than a target bandwidth are aggregated, the bandwidth of the aggregated carriers may be restricted to a bandwidth which is used in an existing system in order to maintain backward compatibility with an existing IMT system. For example, in an existing 3GPP LTE system, {1.4, 3, 5, 10, 15, 20} MHz bandwidths may be supported. In a 3GPP LTE-advanced system (i.e., LTE-A), bandwidths greater than the bandwidth 20 MHz may be supported using only the bandwidths for a backward compatibility with existing systems. Furthermore, in a carrier aggregation system used in an embodiment of the present invention, new bandwidths may be defined regardless of the bandwidths used in the existing systems in order to support a carrier aggregation.

An LTE-A system uses the concept of a cell in order to manage radio resources.

The aforementioned carrier aggregation environment may also be called a multi-cell environment. A cell is defined as a combination of a pair of a downlink resource (DL CC) and an uplink resource (UL CC), but an uplink resource is not an essential element. Accordingly, a cell may consist of a downlink resource only or a downlink resource and an uplink resource. If specific UE has a single configured serving cell, it may have 1 DL CC and 1 UL CC. If specific UE has two or more configured serving cells, it has DL CCs corresponding to the number of cells, and the number of UL CCs may be the same as or smaller than the number of DL CCs.

In some embodiments, a DL CC and an UL CC may be configured in an opposite way. That is, if specific UE has a plurality of configured serving cells, a carrier aggregation environment in which the number of UL CCs is greater than the number of DL CCs may also be supported. That is, a carrier aggregation may be understood as being an aggregation of two or more cells having different carrier frequency (the center frequency of a cell). In this case, the "cell" should be distinguished from a "cell", that is, a region commonly covered by an eNB.

A cell used in an LTE-A system includes a Primary Cell (PCell) and a Secondary Cell (SCell). A PCell and an SCell may be used as serving cells. In the case of UE which is in an RRC_CONNECTED state, but in which a carrier aggregation has not been configured or which does not support a carrier aggregation, only one serving cell configured as only a PCell is present. In contrast, in the case of UE which is in the RRC_CONNECTED state and in which a carrier aggregation has been configured, one or more serving cells may be present. A PCell and one or more SCells are included in each serving cell.

A serving cell (PCell and SCell) may be configured through an RRC parameter. PhysCellId is the physical layer identifier of a cell and has an integer value from 0 to 503. SCellIndex is a short identifier which is used to identify an SCell and has an integer value of 1 to 7. ServCellIndex is a short identifier which is used to identify a serving cell (PCell or SCell) and has an integer value of 0 to 7. The value 0 is applied to a PCell, and SCellIndex is previously assigned in order to apply it to an SCell. That is, in ServCellIndex, a cell having the smallest cell ID (or cell index) becomes a PCell.

A PCell means a cell operating on a primary frequency (or primary CC). A PCell may be used for UE to perform an initial connection establishment process or a connection re-establishment process and may refer to a cell indicated in a handover process. Furthermore, a PCell means a cell that belongs to serving cells configured in a carrier aggregation environment and that becomes the center of control-related communication. That is, UE may receive a PUCCH allocated only in its PCell and send the PUCCH and may use only the PCell to obtain system information or to change a monitoring procedure. An Evolved Universal Terrestrial Radio Access Network (E-UTRAN) may change only a PCell for a handover procedure using the RRC connection reconfiguration (RRCConnectionReconfiguration) message of a higher layer including mobility control information (mobilityControlInfo) for UE which supports a carrier aggregation environment.

An SCell may mean a cell operating on a secondary frequency (or secondary CC). Only one PCell is allocated to specific UE, and one or more SCells may be allocated to the specific UE. An SCell may be configured after RRC connection is established and may be used to provide additional radio resources. A PUCCH is not present in the remaining cells, that is, SCells that belong to serving cells configured in a carrier aggregation environment and that do not include a PCell. When adding an SCell to UE supporting a carrier aggregation environment, an E-UTRAN may provide all types of system information related to the operation of a related cell in the RRC_CONNECTED state through a dedicated signal. A change of system information may be controlled by releasing and adding a related SCell. In this case, the RRC connection reconfiguration (RRCConnectionReconfigutaion) message of a higher layer may be used. An E-UTRAN may send dedicated signaling having a different parameter for each UE instead of broadcasting within a related SCell.

After an initial security activation process is started, an E-UTRAN may configure a network including one or more SCells by adding to a PCell that is initially configured in a connection establishing process. In a carrier aggregation environment, a PCell and an SCell may operate respective component carriers. In the following embodiments, a Primary Component Carrier (PCC) may be used as the same meaning as a PCell, and a Secondary Component Carrier (SCC) may be used as the same meaning as an SCell.

FIG. 7 shows an example of component carriers and a carrier aggregation in a wireless communication system to which an embodiment of the present invention may be applied.

FIG. 7a shows the structure of a single carrier used in an LTE system. A component carrier includes a DL CC and an UL CC. One component carrier may have a frequency range of 20 MHz.

FIG. 7b shows the structure of a carrier aggregation used in an LTE-A system. FIG. 7b shows an example in which 3 component carriers each having a frequency size of 20 MHz have been aggregated. Three DL CCs and three UL CCs have been illustrated in FIG. 9, but the number of DL CCs and UL CCs is not limited. In the case of a carrier aggregation, UE may monitor 3 CCs at the same time, may receive downlink signal/data, and may transmit uplink signal/data.

If N DL CCs are managed in a specific cell, a network may allocate M (M≤N) DL CCs to UE. In this case, the UE may monitor only the M limited DL CCs and receive a DL signal. Furthermore, a network may give priority to L (L≤M≤N) DL CCs and allocate major DL CCs to UE. In this case, the UE must monitor the L DL CCs. Such a method may be applied to uplink transmission in the same manner.

A linkage between a carrier frequency (or DL CC) of a downlink resource and a carrier frequency (or UL CC) of an uplink resource may be indicated by a higher layer message, such as an RRC message, or system information. For example, a combination of DL resources and UL resources may be configured by a linkage defined by System Information Block Type2 (SIB2). Specifically, the linkage may mean a mapping relationship between a DL CC in which a PDCCH carrying an UL grant is transmitted and an UL CC in which the UL grant is used and may mean a mapping relationship between a DL CC (or UL CC) in which data for an HARQ is transmitted and an UL CC (or DL CC) in which an HARQ ACK/NACK signal is transmitted.

When one or more SCells are configured in UE, a network may activate or deactivate the configured SCell(s). A PCell is always activated. The network activates or deactivates the SCell(s) by transmitting an activation/deactivation MAC control element.

The activation/deactivation MAC control element has a fixed size and consists of a single octet including 7 C-fields and 1 R-field. The C-field is configured for each SCell index (SCellIndex) and is indicative of the activation/deactivation of the SCell. When the value of the C-field is set to "1", it indicates the activation of an SCell having the index of the corresponding SCell. When the value of the C-field is set to "0", it indicates the deactivation of an SCell having the index of the corresponding SCell.

Furthermore, the UE maintains a timer (sCellDeactivationTimer) for each configured SCell and deactivates a related SCell when the timer expires. The same initial timer value is applied to each instance of the timer (sCellDeactivationTimer) and configured by RRC signaling. When an SCell(s) is added or after handover, an initial SCell(s) has been deactivated.

UE performs the following operation on each configured SCell(s) in each TTI.

When the UE receives an activation/deactivation MAC control element that activates an SCell in a specific TTI (subframe n), the UE activates an SCell in a TTI (a subframe n+8 or thereafter) corresponding to predetermined timing, and (re)starts a timer related to the corresponding SCell. The activation of the SCell by the UE means that the UE applies common SCell operations, such as the transmission of a sounding reference signal (SRS) on the SCell, the report of a channel quality indicator (CQI)/precoding matrix indicator (PMI)/rank indication (RI)/precoding type indicator (PTI) for the SCell, PDCCH monitoring on the SCell, and PDCCH monitoring for the SCell.

When the UE receives an activation/deactivation MAC control element that deactivates the SCell in a specific TTI (subframe n) or a timer related to the activated SCell in a specific TTI (subframe n) expires, the UE deactivates the SCell in a TTI (subframe n+8 or thereafter) corresponding to predetermined timing, stops the timer of the corresponding SCell, and flushes the entire HARQ buffer related to the corresponding SCell.

When a PDCCH on the activated SCell is indicative of an uplink grant or downlink assignment or when a PDCCH on a serving cell that schedules the activated SCell is indicative of an uplink grant or downlink assignment for the activated SCell, the UE restarts a timer related to the corresponding SCell.

When the SCell is deactivated, the UE does not transmit an SRS on an SCell, does not report a CQI/PMI/RI/PTI for an SCell, and does not transmit an UL-SCH on an SCell, and does not monitor a PDCCH on an SCell.

Coordinated Multi-Point Transmission and Reception (CoMP)

In accordance with the demand of LTE-advanced, CoMP transmission is proposed to enhance performance of a system.

CoMP is referred to as a scheme for two or more eNBs, (Access) Points or Cells cooperate with each other and communicate with UE in order to perform smoothly communication between a specific UE and an eNB, (Access) Point or Cell. The CoMP is also called co-MIMO, collaborative MIMO, network MIMO, and the like. It is anticipated that the CoMP will improves the performance of the UE positioned at a cell boundary and improve an average throughput of the cell (sector).

In this specification, an eNB, an access point, and a cell are used for the same meaning.

In general, inter-cell interference deteriorates performance of UE located in a cell edge and the average cell (or sector) efficiency in a multi-cell environment in which a frequency reuse factor is 1. In order to reduce inter-cell interference, a simple passive method, such as Fractional Frequency Reuse (FFR), has been applied to an LTE system so that UE placed in a cell edge in an interference-limited environment has proper performance efficiency. However, instead of reducing the use of frequency resources per cell, a method of reusing inter-cell interference as a signal required to be received by UE or reducing inter-cell interference is more advantageous. In order to achieve the above object, a CoMP transmission method may be used.

A CoMP method applicable to downlink may be divided into a Joint Processing (JP) method and a Coordinated Scheduling/Beamforming (CS/CB) method.

In case of JP method, the data headed from each eNB that performs the CoMP to UE is transmitted to UE instantaneously and simultaneously, and the UE combines the signal from each of the eNBs so as to improve the reception performance. On the other hand, in the case of the CS/CB, the data headed to a single UE is transmitted instantaneously through a single eNB, and the Scheduling or Beamforming is performed such that the interference exerted on another eNB by the UE becomes the minimum.

In the JP method, data may be used in each point (i.e, eNB) of a CoMP unit. The CoMP unit means a set of eNBs used in the CoMP method. The JP method may be subdivided into a joint transmission method and a dynamic cell selection method.

The joint transmission method is a method of transmitting, by a plurality of points, that is, some or all of the points of a CoMP unit, signals through a PDSCH at the same time. That is, data transmitted to one UE is transmitted from a plurality of transmission points at the same time. The quality of a signal transmitted to UE can be improved coherently or non-coherently and interference between the UE and another UE can be actively removed through such a joint transmission method.

The dynamic cell selection method is a method of sending a signal by one point of a CoMP unit through a PDSCH. That is, data transmitted to one UE on a specific time is transmitted from one point, but is not transmitted from another point within the CoMP unit to the UE. A point at which data is transmitted to UE may be dynamically selected.

In accordance with the CS/CB method, a CoMP unit performs beamforming in cooperation in order to send data to one UE. That is, data is transmitted to UE in a serving cell only, but user scheduling/beamforming may be determined through cooperation between a plurality of cells within a CoMP unit.

In some embodiments, CoMP reception means the reception of a signal transmitted by cooperation between a plurality of points that are geographically separated. A CoMP method which may be applied to uplink may be divided into a Joint Reception (JR) method and a Coordinated Scheduling/Beamforming (CS/CB) method.

The JR method is a method of receiving, by a plurality of points, that is, some or all of the points of a CoMP unit, a signal transmitted through a PDSCH. In the CS/CB method, a signal transmitted through a PDSCH is received only at one point, but user scheduling/beamforming may be determined through cooperation between a plurality of cells within a CoMP unit.

Hybrid-Automatic Repeat and Request (HARQ)

The LTE physical layer supports the HARQ in the PDSCH and the PUSCH, and transmits the related acknowledgement (ACK) feedback in a separate control channel.

In the LTE FDD system, eight Stop-And-Wait (SAW) HARQ processes are supported on both the uplink and the downlink in accordance with a constant round-trip time (RTT) of 8 ms.

FIG. 8 is a diagram illustrating a downlink HARQ process in an LTE FDD system, and FIG. 9 is a diagram illustrating an uplink HARQ process in an LTE FDD system.

Each of the HARQ processes is defined by a unique HARQ process identifier of 3 bits in size, and individual soft buffer allocation for combination of retransmitted data is required for a reception end (that is, UE at the downlink HARQ process, and eNodeB at the uplink HARQ process).

In addition, it is defined that information such as a new data indicator (NDI), a redundancy version (RV) and a modulation and coding scheme (MCS) fields in the downlink control information for the HARQ processes. The NDI field is toggled whenever a new packet transmission is started. The RV field indicates the RV that is selected for a transmission and a retransmission. The MCS field indicates a modulation and coding method level.

The downlink HARQ process of the LTE system is an adaptive asynchronous scheme. Accordingly, the downlink control information for the HARQ process is explicitly accompanied per downlink transmission.

The uplink HARQ process of the LTE system is a synchronous scheme, and may be performed adaptively or non-adaptively. Since the uplink non-adaptive HARQ scheme does not accompany signaling of the explicit control information, the sequence such as previously set RV sequence (i.e., 0, 2, 3, 1, 0, 2, 3, 1, . . . ,) is required for a continuous packet transmission. However, according to the uplink adaptive HARQ scheme, the RV is signaled explicitly. In order to minimize the control signaling, the uplink mode in which the RV (or the MCS) is combined with other control information is also supported.

Limited Buffer Rate Matching (LBRM)

Owing to the entire memory required for saving the Log-Likelihood Ratio (LLR) in order to support the HARQ process (throughout all HARQ processes), that is, the UE HARQ soft buffer size, the complexity in the UE implement is increased.

An object of the Limited Buffer Rate Matching (LBRM) is to maintain the peak data rates and to minimize the influence on the system performance, and in addition, to decrease the UE HARQ soft buffer size. The LBRM reduces the length of virtual circular buffer of the code block segments for the transmission block (TB) that has a size greater than a predetermined size. Using the LBRM, the mother code rate for the TB becomes the function of UE soft buffer size that is allocated to the TB size and the TB. For example, for the UE category that does not support the FDD operation and the UE of the lowest category (e.g., UE categories 1 and 2 that do not support the spatial multiplexing), the limit on the buffer is transparent. That is, the LBRM does not cause the reduction of the soft buffer. In the case of the UE of high category (i.e., UE categories 3, 4 and 5), the size of soft buffer is calculated by assuming the buffer decrease of 50% that corresponds to two thirds of the mother code rate for eight HARQ processes and the maximum TB. Since an eNB knows the soft buffer capacity of UE, the code bit is transmitted in the virtual circular buffer (VCB) that may be stored in the HARQ soft buffer of the UE for all of the given TB (re)transmissions.

Synchronization Signal (SS)

UE performs the initial cell search procedure including acquisition of time and frequency synchronization with the cell and detection of a physical cell ID of the cell. To this end, the UE may receive, from the eNB, synchronization signals, for example, a primary synchronization signal (PSS) and a secondary synchronization signal (SSS), establish synchronization with the eNB, and acquire information such as a cell ID.

FIG. 10 illustrates a radio frame structure for transmitting the Synchronization Signal (SS) in a wireless communication system to which an embodiment of the present invention may be applied.

More specifically, FIG. 10 illustrates the radio frame structure for transmitting the SS and the PBCH in the frequency division duplex (FDD). FIG. 10(a) illustrates a transmission position of the SS and the PBCH in the radio frame configured with a normal cyclic prefix (CP), and FIG. 10(b) illustrates a transmission position of the SS and the PBCH in the radio frame configured with an extended CP.

SSs are divided into a PSS and an SSS. The PSS is used to obtain the time domain synchronization and/or the frequency domain synchronization such as the OFDM symbol synchronization, the slot synchronization, and so on, and the SSS is used to obtain the frame synchronization, a cell group ID and/or a CP configuration (i.e., usage information on the normal CP or the extended CP) of a cell.

Referring to FIG. 10, the PSS and the SSS in the time domain are transmitted on two OFDM symbols in every radio frame, respectively. Specifically, the SSs are transmitted on the first slot of subframe 0 and the first slot of subframe 5, respectively, in consideration of a Global System for Mobile communication (GSM) frame length, 4.6 ms, for facilitation of inter radio access technology (RAT) measurement. In particular, the PSS is transmitted on the last OFDM symbol of the first slot of subframe 0 and the last OFDM symbol of the first slot of subframe 5, and the SSS is transmitted on the second last OFDM symbol of the first slot of subframe 0 and the second last OFDM symbol of the first slot of subframe 5.

The boundary of a corresponding radio frame may be detected through the SSS. The PSS is transmitted on the last OFDM symbol of a corresponding slot, the SSS is transmitted on the immediately before the OFDM symbol of the PSS. The transmission diversity scheme of the SS uses only a single antenna port, and is not separately defined in the standard. That is, a single antenna port transmission scheme or a transmission scheme transparent to the UE (e.g., the precoding vector switching (PVS), the time switched diversity (TSTD), and the cyclic delay diversity (CDD)) may be used for the transmission diversity of the SS.

The PSS is transmitted on every 5 ms, and accordingly, the UE may recognize that the corresponding subframe is one of subframe 0 and subframe 5 by detecting the PSS, but may not specifically identify the subframe as subframe 0 or subframe 5. Accordingly, the UE is not capable of recognizing a boundary of radio frames with the PSS alone. That is, the frame synchronization cannot be acquired with the PSS alone. The UE detects the boundary of radio frames by detecting the SSS transmitted twice with different sequences in one radio frame.

In the frequency domain, the PSS and the SSS are mapped to six RBs positioned on the center of the downlink system bandwidth. In a downlink, the entire RBs includes different number of RBs (e.g., 6 RBs to 110 RBs) depending on the system bandwidth, but UE may detect the PSS and the SSS in the same way since the PSS and the SSS are mapped to 6 RBs positioned on the center of the downlink system bandwidth.

Both of the PSS and the SSS include the sequence that has the length of 62. Accordingly, the PSS and the SSS are mapped to 62 subcarriers on the center, which are located at opposite sides of the DC subcarrier among 6 RBs, and the DC subcarrier and each of 5 subcarriers located at opposite side ends are not used.

UE may obtain the physical layer cell ID from a specific sequence of the PSS and the SSS. That is, the combination of 3 PSSs and 168 SSSs, the SS may represent total 504 specific physical layer cell identities (PCIDs).

In other words, the physical layer cell IDs are grouped into 168 physical-layer cell-ID groups that include three specific IDs in each group such that each of the physical layer cell IDs becomes a part of only one physical-layer cell-ID group. Accordingly, the physical layer cell ID Ncell ID (=3N(1) ID+N(2) ID) is specifically defined by the number N(1) ID within the range of 0 to 167 that represents the physical-layer cell-ID group and the number N(2) ID within the range of 0 to 2 that represents the physical-layer ID in the physical-layer cell-ID group.

UE may know one of three specific physical-layer IDs by detecting the PSS and may recognize one of 168 physical layer cell IDs related to the physical-layer ID by detecting the SSS.

The PSS is generated based on the Zadoff-Chu (ZC) sequence that includes the length of 63 which is defined in the frequency domain.

$$d_u(n) = e^{-j\frac{\pi un(n+1)}{N_{ZC}}}$$ [Equation 12]

The ZC sequence is defined by Equation 12. And the sequence element n=31, corresponding to the DC subcarrier, is punctured. In Equation 12, $N_{ZC}$=63.

The remaining 9 subcarriers among 6 RBs (=72 subcarriers) in the center portion of the system bandwidth are always transmitted with zero value, which leads to the ease in designing the filter for performing synchronization.

In order to define total three PSSs, the values u=25, 29 and 34 are used in Equation 12. In this case, since 29 and 34 are in conjugated symmetry relation, two correlations may be simultaneously performed. Herein, the conjugate symmetry means the relation shown in Equation 13 below. Using the characteristics, the implementation of one-shot correlator for u=29 and 34 is available, which may decrease about 33.3% in overall amount of operations.

$$d_u(n) = (-1)^n (d_{N_{ZC}-u}(n))^*, \text{ when } N_{ZC} \text{ is even number.}$$

$$d_u(n) = (d_{N_{ZC}-u}(n))^*, \text{ when } N_{ZC} \text{ is odd number.}$$ [Equation 13]

The SSS is generated based on the M-sequence. Each SSS sequence is generated by concatenating SSC 1 sequence and SSC 2 sequence, which is two interleaved sequences, of which length is 31 in the frequency domain. By combining two sequences, 168 cell group IDs are transmitted. The m-sequence as the SSS sequence is robust in the frequency selective environment, and may be transformed to the high-speed m-sequence using the Fast Hadamard Transform, thereby the amount of operations being decreased. In addition, the configuration of SSS using two short codes is proposed to decrease the amount of operations of UE.

FIG. 11 illustrates a structure that two sequences for generating the secondary synchronization signal are mapped in the physical region with being interleaved.

When two m-sequences used for generating the SSS sign are defined by SSS 1 and SSS 2, in the case that the SSS (SSS 1, SSS 2) of subframe 0 transmits the cell group ID with the combination, the SSS (SSS 2, SSS 1) of subframe 5 is transmitted with being swapped, thereby distinguishing the 10 ms frame boundary. In this case, the SSS sign uses the generation polynomial $x^5+x^2+1$, and total 31 signs may be generated through the circular shift. In order to improve the reception performance, two different PSS-based sequences are defined and scrambled to the SSS, and scrambled to SSS 1 and SSS 2 with different sequences. Later, by defining the SSS 1-based scrambling sign, the scrambling is performed to SSS 2. In this case, the sign of SSS is exchanged in a unit of 5 ms, but the PSS-based scrambling sign is not exchanged. The PSS-based scrambling sign is defined by six circular shift versions according to the PSS index in the m-sequence generated from the generation polynomial $x^5+x^2+1$, and the SSS 1-based scrambling sign is defined by eight circular shift versions according to the SSS 1 index in the m-sequence generated from the generation polynomial $x^5+x^4+x^2+x^1+1$.

Reference Signal (RS)

In the wireless communication system, since the data is transmitted through the radio channel, the signal may be distorted during transmission. In order for the receiver side to accurately receive the distorted signal, the distortion of the received signal needs to be corrected by using channel information. In order to detect the channel information, a signal transmitting method know by both the transmitter side and the receiver side and a method for detecting the channel information by using an distortion degree when the signal is transmitted through the channel are primarily used. The aforementioned signal is referred to as a pilot signal or a reference signal (RS).

Recently, when packets are transmitted in most of mobile communication systems, multiple transmitting antennas and multiple receiving antennas are adopted to increase transmission/reception efficiency rather than a single transmitting antenna and a single receiving antenna. When the data is transmitted and received by using the MIMO antenna, a channel state between the transmitting antenna and the receiving antenna need to be detected in order to accurately receive the signal. Therefore, the respective transmitting antennas need to have individual reference signals.

Reference signal in a wireless communication system can be mainly categorized into two types. In particular, there are a reference signal for the purpose of channel information acquisition and a reference signal used for data demodulation. Since the object of the former reference signal is to enable UE (user equipment) to acquire a channel information in DL (downlink), the former reference signal should be transmitted on broadband. And, even if the UE does not receive DL data in a specific subframe, it should perform a channel measurement by receiving the corresponding reference signal. Moreover, the corresponding reference signal can be used for a measurement for mobility management of a handover or the like. The latter reference signal is the reference signal transmitted together when a base station transmits DL data. If UE receives the corresponding reference signal, the UE can perform channel estimation, thereby demodulating data. And, the corresponding reference signal should be transmitted in a data transmitted region.

The DL reference signals are categorized into a common reference signal (CRS) shared by all terminals for an acquisition of information on a channel state and a measurement associated with a handover or the like and a dedicated reference signal (DRS) used for a data demodulation for a specific terminal. Information for demodulation and channel measurement may be provided by using the reference signals. That is, the DRS is used only for data demodulation only, while the CRS is used for two kinds of purposes including channel information acquisition and data demodulation.

The receiver side (that is, terminal) measures the channel state from the CRS and feeds back the indicators associated with the channel quality, such as the channel quality indicator (COI), the precoding matrix index (PMI), and/or the rank indicator (RI) to the transmitting side (that is, base station). The CRS is also referred to as a cell-specific RS. On the contrary, a reference signal associated with a feed-back of channel state information (CSI) may be defined as CSI-RS.

The DRS may be transmitted through resource elements when data demodulation on the PDSCH is required. The terminal may receive whether the DRS is present through the upper layer and is valid only when the corresponding PDSCH is mapped. The DRS may be referred to as the UE-specific RS or the demodulation RS (DMRS).

FIG. 12 illustrates a reference signal pattern mapped to a downlink resource block pair in the wireless communication system to which an embodiment of the present invention may be applied.

Referring to FIG. 12, as a unit in which the reference signal is mapped, the downlink resource block pair may be expressed by one subframe in the time domain×12 subcarriers in the frequency domain. That is, one resource block pair has a length of 14 OFDM symbols in the case of a normal cyclic prefix (CP) (FIG. 12a) and a length of 12 OFDM symbols in the case of an extended cyclic prefix (CP) (FIG. 12b). Resource elements (REs) represented as '0', '1', '2', and '3' in a resource block lattice mean the positions of the CRSs of antenna port indexes '0', '1', '2', and '3', respectively and resource elements represented as 'D' means the position of the DRS.

Hereinafter, when the CRS is described in more detail, the CRS is used to estimate a channel of a physical antenna and distributed in a whole frequency band as the reference signal which may be commonly received by all terminals positioned in the cell. That is, the CRS is transmitted in each subframe across a broadband as a cell-specific signal. Further, the CRS may be used for the channel quality information (CSI) and data demodulation.

The CRS is defined as various formats according to an antenna array at the transmitter side (base station). The RSs are transmitted based on maximum 4 antenna ports depending on the number of transmitting antennas of a base station in the 3GPP LTE system (for example, release-8). The transmitter side has three types of antenna arrays of three single transmitting antennas, two transmitting antennas, and four transmitting antennas. For instance, in case that the number of the transmitting antennas of the base station is 2, CRSs for antenna #1 and antenna #2 are transmitted. For another instance, in case that the number of the transmitting antennas of the base station is 4, CRSs for antennas #1 to #4 are transmitted.

When the base station uses the single transmitting antenna, a reference signal for a single antenna port is arrayed.

When the base station uses two transmitting antennas, reference signals for two transmitting antenna ports are arrayed by using a time division multiplexing (TDM) scheme and/or a frequency division multiplexing (FDM) scheme. That is, different time resources and/or different frequency resources are allocated to the reference signals for two antenna ports which are distinguished from each other.

Moreover, when the base station uses four transmitting antennas, reference signals for four transmitting antenna ports are arrayed by using the TDM and/or FDM scheme. Channel information measured by a downlink signal receiving side (terminal) may be used to demodulate data transmitted by using a transmission scheme such as single transmitting antenna transmission, transmission diversity, closed-loop spatial multiplexing, open-loop spatial multiplexing, or multi-user MIMO.

In the case where the MIMO antenna is supported, when the reference signal is transmitted from a specific antenna port, the reference signal is transmitted to the positions of specific resource elements according to a pattern of the reference signal and not transmitted to the positions of the specific resource elements for another antenna port. That is, reference signals among different antennas are not duplicated with each other.

A rule for mapping a CRS to a resource block is defined as below.

$$k = 6m + (v + v_{shift}) \bmod 6 \quad \text{[Equation 14]}$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

In Equation 14, k and l represent the subcarrier index and the symbol index, respectively and p represents the antenna port. $N_{symb}^{DL}$ represents the number of OFDM symbols in one downlink slot and $N_{RB}^{DL}$ represents the number of radio resources allocated to the downlink. $n_s$ represents a slot index and, $N_{ID}^{cell}$ represents a cell ID. mod represents an modulo operation. The position of the reference signal varies depending on the $v_{shift}$ value in the frequency domain. Since $v_{shift}$ depends on the cell ID (i.e., physical layer cell ID), the position of the reference signal has various frequency shift values according to the cell.

In more detail, the position of the CRS may be shifted in the frequency domain according to the cell in order to improve channel estimation performance through the CRS. For example, when the reference signal is positioned at an interval of three subcarriers, reference signals in one cell are allocated to a 3 k-th subcarrier and a reference signal in another cell is allocated to a 3k+1-th subcarrier. In terms of one antenna port, the reference signals are arrayed at an interval of six resource elements in the frequency domain and separated from a reference signal allocated to another antenna port at an interval of three resource elements.

In the time domain, the reference signals are arrayed at a constant interval from symbol index 0 of each slot. The time interval is defined differently according to a cyclic shift length. In the case of the normal cyclic shift, the reference signal is positioned at symbol indexes 0 and 4 of the slot and in the case of the extended CP, the reference signal is positioned at symbol indexes 0 and 3 of the slot. A reference signal for an antenna port having a maximum value between two antenna ports is defined in one OFDM symbol. Therefore, in the case of transmission of four transmitting antennas, reference signals for reference signal antenna ports 0 and 1 are positioned at symbol indexes 0 and 4 (symbol indexes 0 and 3 in the case of the extended CP) and reference signals for antenna ports 2 and 3 are positioned at symbol index 1 of the slot. The positions of the reference signals for antenna ports 2 and 3 in the frequency domain are exchanged with each other in a second slot.

Hereinafter, when the DRS is described in more detail, the DRS is used for demodulating data. A precoding weight used for a specific terminal in the MIMO antenna transmission is used without a change in order to estimate a channel associated with and corresponding to a transmission channel transmitted in each transmitting antenna when the terminal receives the reference signal.

The 3GPP LTE system (for example, release-8) supports a maximum of four transmitting antennas and a DRS for rank 1 beamforming is defined. The DRS for the rank 1 beamforming also means a reference signal for antenna port index 5.

A rule of mapping the DRS to the resource block is defined as below. Equation 15 shows the case of the normal CP and Equation 14 shows the case of the extended CP.

$$k = (k') \bmod N_{sc}^{RB} + N_{sc}^{RB} \cdot n_{PRB} \quad \text{[Equation 15]}$$

$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

$$l = \begin{cases} 3 & l' = 0 \\ 6 & l' = 1 \\ 2 & l' = 2 \\ 5 & l' = 3 \end{cases}$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, \ldots, 3N_{RB}^{PDSCH} - 1$$

$$v_{shift} = N_{ID}^{cell} \bmod 3$$

$$k = (k') \bmod N_{sc}^{RB} + N_{sc}^{RB} \cdot n_{PRB} \quad \text{[Equation 16]}$$

$$k' = \begin{cases} 3m' + v_{shift} & \text{if } l = 4 \\ 3m' + (2 + v_{shift}) \bmod 3 & \text{if } l = 1 \end{cases}$$

$$l = \begin{cases} 4 & l' \in \{0, 2\} \\ 1 & l' = 1 \end{cases}$$

$$l' = \begin{cases} 0 & \text{if } n_s \bmod 2 = 0 \\ 2, 3 & \text{if } n_s \bmod 2 = 1 \end{cases}$$

$$m' = 0, 1, \ldots, 4N_{RB}^{PDSCH} - 1$$

$$v_{shift} = N_{ID}^{cell} \bmod 3$$

In Equations 15 and 16, k and l indicate a subcarrier index and a symbol index, respectively, and p indicates an antenna port. $N_{sc}^{RB}$ indicates the size of the resource block in the frequency domain and is expressed as the number of subcarriers. $n_{PRB}$ indicates the number of physical resource blocks. $N_{RB}^{PDSCH}$ indicates a frequency band of the resource block for the PDSCH transmission. $n_s$ indicates the slot index and $N_{ID}^{cell}$ indicates the cell ID. mod indicates the modulo operation. The position of the reference signal varies depending on the $v_{shift}$ value in the frequency domain. Since $v_{shift}$ depends on the cell ID (i.e., physical layer cell ID), the position of the reference signal has various frequency shift values according to the cell.

A LTE-A system, that is, an evolved version of an LTE system, should support maximum eight transmitting antennas for downlink transmission. Accordingly, reference signals for maximum eight transmitting antennas should also be supported. In the LTE system, since the downlink reference signals are defined for maximum four antenna ports, if the base station includes at least 4 downlink transmitting antennas or maximum eight downlink transmitting antennas in the LTE-A system, the reference signals for these antenna ports should be defined additionally. The reference signals for maximum eight transmitting antenna ports should be designed for two types of reference signals, i.e., the reference signal for channel measurement and the reference signal for data demodulation.

One of important considerations in designing the LTE-A system is the backward compatibility. That is, the backward compatibility means that the LTE user equipment should be operated normally even in the LTE-A system without any problem and the LTE-A system should also support such normal operation. In view of reference signal transmission, the reference signals for maximum eight transmitting antenna ports should be defined additionally in the time-frequency domain to which CRS defined in the LTE is transmitted on full band each subframe. However, in the LTE-A system, if reference signal patterns for maximum eight transmitting antennas are added to full band per subframe in the same manner as the CRS of the existing LTE system, the RS overhead becomes too great.

Accordingly, the reference signal designed newly in the LTE-A system may be divided into two types. Examples of the two types of reference signals include a channel state information-reference signal (CSI-RS) (or may be referred to as channel state indication-RS) for channel measurement for selection of modulation and coding scheme (MCS) and a precoding matrix index (PMI), and a data demodulation-reference signal (DM-RS) for demodulation of data transmitted to eight transmitting antennas.

The CSI-RS for the channel measurement purpose is designed for channel measurement mainly unlike the existing CRS used for channel measurement, handover measurement, and data demodulation. The CSI-RS may also be used for handover measurement. Since the CSI-RS is transmitted only to obtain channel state information, it may not be transmitted per subframe unlike the CRS of the existing LTE system. Accordingly, in order to reduce overhead, the CSI-RS may intermittently be transmitted on the time axis.

The DM-RS is dedicatedly transmitted to the UE which is scheduled in the corresponding time-frequency domain for data demodulation. In other words, the DM-RS of a specific UE is only transmitted to the region where the corresponding user equipment is scheduled, i.e., the time-frequency domain that receives data.

In the LTE-A system, an eNB should transmit the CSI-RSs for all the antenna ports. Since the transmission of CSI-RSs for up to eight transmission antenna ports in every subframe leads to too much overhead, the CSI-RSs should be transmitted intermittently along the time axis, thereby reducing CSI-RS overhead. Therefore, the CSI-RSs may be transmitted periodically at every integer multiple of one subframe, or in a predetermined transmission pattern. The CSI-RS transmission period or pattern of the CSI-RSs may be configured by the eNB.

In order to measure the CSI-RSs, UE should have knowledge of the information for each of the CSI-RS antenna ports in the cell to which UE belongs such as the transmission subframe index, the time-frequency position of the CSI-RS resource element (RE) in the transmission subframe, the CSI-RS sequence, and the like.

In the LTE-A system, an eNB should transmit each of the CSI-RSs for maximum eight antenna ports, respectively. The resources used for transmitting the CSI-RS of different antenna ports should be orthogonal. When an eNB transmits the CSI-RS for different antenna ports, by mapping the CSI-RS for each of the antenna ports to different REs, the resources may be orthogonally allocated in the FDM/TDM scheme. Otherwise, the CSI-RSs for different antenna ports may be transmitted in the CDM scheme with being mapped to the mutually orthogonal codes.

When an eNB notifies the information of the CSI-RS to the UE in its own cell, the information of the time-frequency in which the CSI-RS for each antenna port is mapped should be notified. More specifically, the information includes the subframe numbers on which the CSI-RS is transmitted, the period of the CSI-RS being transmitted, the subframe offset in which the CSI-RS is transmitted, the OFDM symbol number in which the CSI-RS RE of a specific antenna is transmitted, the frequency spacing, the offset or shift value of RE on the frequency axis.

FIG. 13 illustrates a periodic transmission scheme of CSI-RS in a wireless communication system to which an embodiment of the present invention may be applied.

As shown in FIG. 13, for an eNB that transmits the CSI-RS, the transmission period of the corresponding eNB is 10 (ms or subframes), and the transmission offset of the CSI-RS is 3 (subframes). The eNB has different offset values such that the CSI-RS of several cells should be evenly distributed on the time. The eNB in which the CSI-RS is transmitted in the period of 10 ms has ten offset values of 0 to 9. The offset values represent the value of subframes on which the eNB that has a specific period actually starts the CSI-RS transmission. When the eNB notifies the period and the offset value of the CSI-RS to UE, the UE measures the CSI-RS of the eNB on the corresponding position using the value and reports the information such as CQI/PMI/RI, etc. To the eNB. The all types of the information related to the CSI-RS are cell-specific information.

FIG. 14 illustrates an aperiodic transmission scheme of CSI-RS in a wireless communication system to which an embodiment of the present invention may be applied.

FIG. 14 exemplifies the scheme that the CSI-RS is transmitted with a transmission subframe pattern. The CSI-RS transmission pattern includes 10 subframes, and whether to transmit the CSI-RS is designated by 1 bit indicator in each subframe.

In general, the following two schemes are taken into consideration as the scheme that an eNB notifies the CSI-RS configuration to UE.

First, the first scheme of using the Dynamic BCH (DBCH) signaling may be taken into consideration.

The first scheme is the scheme that an eNB broadcasts the information of the CSI-RS configuration to pieces of UE. In the LTE system, when an eNB notifies the contents for the system information to pieces of UE, the corresponding information is transmitted to the Broadcasting Channel (BCH), normally. However, in the case that there are too much contents and it is unable to transmit all of the contents to the BCH, the contents are transmitted in the same way of transmitting normal data, but the PDCCH of the corresponding data is transmitted by masking CRC using the System information RNTI (SI-RNTI), not a specific UE ID (e.g., C-RNTI). And, the actual system information is transmitted to the PDSCH region like the normal unicast data. Then, all of types of UE in a cell decodes the PDCCH using the SI-RNTI, and acquires the system information by decoding the PDSCH indicated by the PDCCH. Such a broadcast scheme is also called the Dynamic BCH (DBCH), distinguished from the Physical BCH (PBCH) scheme that is normal broadcast scheme.

The system information broadcasted in the LTE system is divided into two types, largely: The Master Information Block (MIB) transmitted to the PBCH and the System Information Block (SIB) transmitted to the PDSCH with being multiplexed with the normal unicast data. In the LTE system, since the information transmitted in SIB type 1 to SIB type 8 (SIB 1~SIB 8) is already defined, the CSI-RS configuration is transmitted in SIB 9, SIB 10, and so on, which are newly introduced into the LTE-A system.

Next, the second scheme using the RRC signaling may be taken into consideration.

The second scheme is the scheme that an eNB notifies the CSI-RS configuration to each of pieces of UE using the dedicated RRC signaling. During the process that UE establishes a connection to the eNB through an initial access or the handover, the eNB notifies the CSI-RS configuration to the corresponding UE through the RRC signaling. Otherwise, the eNB notifies the CSI-RS configuration through an RRC signaling message that requires a channel state feedback based on the CSI-RS measurement to the UE.

A CSI-RS-Config information element (IE) is used to specify a CSI-RS configuration.

Table 2 exemplifies a CSI-RS-Config IE.

TABLE 2

```
-- ASN1START
CSI-RS-Config-r10 ::=       SEQUENCE {
    csi-RS-r10                  CHOICE {
        release                     NULL,
        setup                       SEQUENCE {
            antennaPortsCount-r10       ENUMERATED {an1, an2, an4, an8},
            resourceConfig-r10          INTEGER (0..31),
            subframeConfig-r10          INTEGER (0..154),
            p-C-r10                     INTEGER (-8..15)
        }
    }                                                   OPTIONAL,      -
- Need ON
    zeroTxPowerCSI-RS-r10       CHOICE {
        release                     NULL,
        setup                       SEQUENCE {
            zeroTxPowerResourceConfigList-r10 BIT STRING (SIZE (16)),
            zeroTxPowerSubframeConfig-r10     INTEGER (0..154)
        }
    }                                                   OPTIONAL       -
- Need ON
}
-- ASN1STOP
```

Referring to Table 2, the 'antennaPortsCount' field indicates the number of antenna ports used for transmitting the CSI-RS. The 'resourceConfig' field indicates the CSI-RS configuration. The 'SubframeConfig' field and the 'zeroTxPowerSubframeConfig' field indicate the subframe configuration ($I_{CSI-RS}$) on which the CSI-RS is transmitted.

The 'zeroTxPowerResourceConfigList' field indicates the zero-power (ZP) CSI-RS configuration. In the bitmap of 16 bit that configures the 'zeroTxPowerResourceConfigList' field, the CSI-RS configuration that corresponds to the bit configured as '1' may be configured as the ZP CSI-RS.

The 'p-c' field represents the parameter ($P_c$) assumed by a ratio of the PDSCH Energy Per Resource Element (EPRE) and the CSI-RS EPRE.

The CSI-RS is transmitted through 1, 2, 4 or 8 antenna ports. In this case, the antenna port which is used is p=15, p=15,16, p=15, . . . , 18, or p=15, . . . , 22. The CSI-RS may be defined only for the subcarrier interval Δf=15 kHz.

The CSI-RS sequence may be generated by Equation 17 below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 17]

$$m = 0, 1, \ldots, N_{RB}^{max,DL} - 1$$

Herein, $r_{l,n_s}(m)$ represents the generated CSI-RS sequence, c(i) represents the pseudo-random, $n_s$ s is a slot number in a radio frame, l represents an OFDM symbol number in a slot, and $N_{RB}^{max,DL}$ represents the maximum RB number in a downlink bandwidth.

The pseudo-random sequence generator is initialized in every OFDM start as represented by Equation 18 below.

$$c_{init} = 2^{10} \cdot (7 \cdot (n_s+1)+l+1) \cdot (2 \cdot N_{ID}^{cell}+1) + 2 \cdot N_{ID}^{cell} + N_{CP}$$ [Equation 18]

In Equation 18, $N_{ID}^{cell}$ represents the cell ID, $N_{CP}=1$ in the case of the normal CP and $N_{CP}=0$ in the case of the extended CP.

In the subframe configured to transmit the CSI-RS, the CSI-RS sequence $r_{l,n_s}(m)$ generated through Equation 17 is mapped to the complex-valued modulation symbol $a_{k,l}^{(p)}$ that is used as a reference symbol on each antenna port (p) as represented by Equation 19 below.

$$a_{k,l}^{(p)} = w_{l''} \cdot r_{l,n_s}(m')$$ [Equation 19]

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

$$l = l' +
\begin{cases}
l'' & \text{CSI reference signal configurations 0-19,} \\
& \text{normal cyclic prefix} \\
2l'' & \text{CSI reference signal configurations 20-31,} \\
& \text{normal cyclic prefix} \\
l'' & \text{CSI reference signal configurations 0-27,} \\
& \text{extended cyclic prefix}
\end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

-continued $$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 19, (k', l') (k' is a subcarrier index in a resource block, and l' indicates an OFDM symbol index in a slot) and the condition of $n_s$ is determined according to the CSI-RS configuration shown in Table 3 or Table 4 below.

Table 3 exemplifies the mapping of (k', l') according to a CSI-RS configuration for a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 exemplifies the mapping of (k', l') according to a CSI-RS configuration for an extended CP.

TABLE 4

| | CSI reference signal configuration | Number of CSI reference signals configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |

TABLE 4-continued

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Referring to Table 3 and Table 4, for the CSI-RS transmission, in order to decrease the inter-cell interference (ICI) in the multi-cell environment including the heterogeneous network (HetNet) environment, different configurations of maximum 32 (in the case of normal CP) or maximum 28 (in the case of extended CP) are defined.

The CSI-RS configuration is different depending on the number of antenna ports in a cell and the CP, neighboring cells may have different configurations to the maximum. In addition, the CSI-RS configuration may be divided into the case of being applied to both the FDD frame and the TDD frame and the case of being applied to only the TDD frame.

Based on Table 3 and Table 4, (k', l') and $n_s$ are determined according to the CSI-RS configuration. By applying these values to Equation 19, the time-frequency resource that each CSI-RS antenna port uses for transmitting the CSI-RS is determined.

FIG. 15 is a diagram illustrating the CSI-RS configuration in a wireless communication system to which an embodiment of the present invention may be applied.

More specifically, FIG. 15 exemplifies the CSI-RS configuration (i.e., the case of normal CP) according to Equation 19 and Table 3.

FIG. 15(a) shows twenty CSI-RS configurations that are usable in the CSI-RS transmission through one or two CSI-RS antenna ports, and FIG. 15(b) shows ten CSI-RS configurations that are usable by four CSI-RS antenna ports. FIG. 15(c) shows five CSI-RS configurations that are usable in the CSI-RS transmission through eight CSI-RS antenna ports.

As described above, according to each CSI-RS configuration, the radio resource (i.e., RE pair) in which the CSI-RS is transmitted is determined.

When one or two CSI-RS antenna ports are configured for transmitting the CSI-RS for a specific cell, the CSI-RS is transmitted on the radio resource according to the configured CSI-RS configuration among twenty CSI-RS configurations shown in FIG. 15(a).

Similarly, when four CSI-RS antenna ports are configured for transmitting the CSI-RS for a specific cell, the CSI-RS is transmitted on the radio resource according to the configured CSI-RS configuration among ten CSI-RS configurations shown in FIG. 15(b). In addition, when eight CSI-RS antenna ports are configured for transmitting the CSI-RS for a specific cell, the CSI-RS is transmitted on the radio resource according to the configured CSI-RS configuration among five CSI-RS configurations shown in FIG. 15(c).

The CSI-RS for each of the antenna ports is transmitted with being CDM to the same radio resource for each of two antenna ports (i.e., {15,16}, {17,18}, {19,20}, {21,22}). As an example of antenna ports 15 and 16, although the respective CSI-RS complex symbols are the same for antenna ports 15 and 16, the CSI-RS complex symbols are mapped to the same radio resource with being multiplied by different orthogonal codes (e.g., Walsh code). To the complex symbol of the CSI-RS for antenna port 15, [1, 1] is multiplied, and [1, −1] is multiplied to the complex symbol of the CSI-RS for antenna port 16, and the complex symbols are mapped to the same radio resource. This procedure is the same for antenna ports {17,18}, {19,20} and {21,22}.

UE may detect the CSI-RS for a specific antenna port by multiplying a code multiplied by the transmitted code. That is, in order to detect the CSI-RS for antenna port 15, the multiplied code [1 1] is multiplied, and in order to detect the CSI-RS for antenna port 16, the multiplied code [1 −1] is multiplied.

Referring to FIG. 15(a) to (c), when a radio resource is corresponding to the same CSI-RS configuration index, the radio resource according to the CSI-RS configuration including a large number of antenna ports includes the radio resource according to the CSI-RS configuration including a small number of antenna ports. For example, in the case of CSI-RS configuration 0, the radio resource for eight antenna ports includes all of the radio resource for four antenna ports and one or two antenna ports.

A plurality of CSI-RS configurations may be used in a cell. Zero or one CSI-RS configuration may be used for the non-zero power (NZP) CSI-RS, and zero or several CSI-RS configurations may be used for the zero power CSI-RS.

UE presumes the zero power transmission for the REs (except the case of being overlapped with the RE that presumes the NZP CSI-RS that is configured by a high layer) that corresponds to four CSI-RS column in Table 3 and Table 4 above, for every bit that is configured as '1' in the Zero Power CSI-RS (ZP-CSI-RS) which is the bitmap of 16 bits configured by a high layer. The Most Significant Bit (MSB) corresponds to the lowest CSI-RS configuration index, and the next bit in the bitmap corresponds to the next CSI-RS configuration index in order.

The CSI-RS is transmitted in the downlink slot only that satisfies the condition of $n_s$ mod 2 in Table 3 and Table 4 above and the CSI-RS subframe configuration.

In the case of frame structure type 2 (TDD), in the subframe that collides with a special subframe, SS, PBCH or SIB 1 (SystemInformationBlockType1) message transmission or the subframe that is configured to transmit a paging message, the CSI-RS is not transmitted.

In addition, the RE in which the CSI-RS for a certain antenna port that is belonged to an antenna port set S (s={15}, s={15,16}, s={17,18}, s={19,20} or s={21,22}) is transmitted is not used for transmitting the PDSCH or the CSI-RS of another antenna port.

Since the time-frequency resources used for transmitting the CSI-RS is unable to be used for transmitting data, the data throughput decreases as the CSI-RS overhead increases. Considering this, the CSI-RS is not configured to be transmitted in every subframe, but configured to be transmitted in a certain transmission period that corresponds to a plurality of subframes. In this case, the CSI-RS transmission overhead may be significantly decreased in comparison with the case that the CSI-RS is transmitted in every subframe.

The subframe period (hereinafter, referred to as 'CSI-RS transmission period'; $T_{CSI-RS}$) for transmitting the CSI-RS and the subframe offset ($\Delta_{CSI-RS}$) are represented in Table 5 below.

Table 5 exemplifies the configuration of CSI-RS subframe.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Referring to Table 5, according to the CSI-RS subframe configuration ($I_{CSI-RS}$), the CSI-RS transmission period ($T_{CSI-RS}$) and the subframe offset ($\Delta_{CSI-RS}$) are determined.

The CSI-RS subframe configuration in Table 5 is configured as one of the 'SubframeConfig' field and the 'zeroTxPowerSubframeConfig' field in Table 2 above. The CSI-RS subframe configuration may be separately configured for the NZP CSI-RS and the ZP CSI-RS.

The subframe including the CSI-RS satisfies Equation 20 below.

$$(10n_f+\lfloor n_s/2 \rfloor - \Delta_{CSI-RS}) \bmod T_{CSI-RS}=0 \quad \text{[Equation 20]}$$

In Equation 20, $T_{CSI-RS}$ represents the CSI-RS transmission period, $\Delta_{CSI-RS}$ represents the subframe offset value, $n_f$ represents the system frame number, and $n_s$ represents the slot number.

In the case of UE in which transmission mode 9 has been configured with respect to a serving cell, a single CSI-RS resource may be configured in the UE. In the case of UE in which transmission mode 10 has been configured with respect to a serving cell, one or more CSI-RS resources may be configured in the UE.

For each CSI-RS resource configuration, the following parameters may be set through high layer signaling.

In the case that transmission mode 10 is set, the CSI-RS resource configuration identifier
  The number of CSI-RS ports
  The CSI-RS configuration (refer to Table 3 and Table 4)
  The CSI-RS subframe configuration ($I_{CSI-RS}$; refer to Table 5)
  When transmission mode 9 is set, the transmission power ($P_c$) for the CSI feedback
  When transmission mode 10 is set, the transmission power ($P_c$) for the CSI feedback with respect to each CSI process. When the CSI subframe sets $C_{CSI,0}$ and $C_{CSI,1}$ are set by a high layer for the CSI process, $P_c$ is set for each CSI subframe set of the CSI process.

The pseudo-random sequence generator parameter ($n_{ID}$)

When transmission mode 10 is set, the QCL scrambling identifier (qcl-ScramblingIdentity-r11) for assuming of the Quasi Co-Located (QCL) type B UE, the CRS port count (crs-PortsCount-r11), and the high layer parameter ('qcl-CRS-Info-r11') that includes the Multicast-broadcast single-frequency network (MBSFN) subframe configuration list (mbsfn-SubframeConfigList-r11) parameter When the CSI feedback value obtained by UE has the value in the range of [−8, 15] dB, $P_c$ is presumed by the ratio of the PDSCH EPRE for the CSI-RS EPRE. Herein, the PDSCH EPRE corresponds to the symbol in which the ratio of PDSCH EPRE for the CRS EPRE is $\rho_A$.

In the same subframe of a serving cell, the CSI-RS and the PMCH are not configured together.

When four CRS antenna ports are configured in frame structure type 2, the CSI-RS configuration index belonged to [20-31] set in the case of the normal CP (refer to Table 3) or [16-27] set in the case of the extended CP (refer to Table 4) is not configured to UE.

UE may assume that the CSI-RS antenna port of the CSI-RS resource configuration has the QCL relation with the delay spread, the Doppler spread, the Doppler shift, the average gain and the average delay.

The UE in which transmission mode 10 and QCL Type B are set may assume that the antenna ports 0 to 3 corresponding to the CSI-RS resource configuration and the antenna ports 15 to 22 corresponding to the CSI-RS resource configuration have the QCL relation with the Doppler spread and the Doppler shift.

For UE in which transmission mode 10 is set, one or more Channel-State Information-Interference Measurement (CSI-IM) resource configuration may be set.

The following parameters may be configured for each CSI-IM resource configuration through high layer signaling.
  The ZP CSI-RS configuration (refer to Table 3 and Table 4)
  The ZP CSI-RS subframe configuration ($I_{CSI-RS}$; refer to Table 5)

The CSI-IM resource configuration is the same as one of the configured ZP CSI-RS resource configuration.

In the same subframe in a serving cell, the CSI-IM resource and the PMCH are not configured simultaneously.

For the UE to which transmission modes 1 to 9 are set, a ZP CSI-RS resource configuration may be configured in the UE for the serving cell. For the UE to which transmission mode 10 is set, one or more ZP CSI-RS resource configurations may be configured in the UE for the serving cell.

The following parameters may be configured for the ZP CSI-RS resource configuration through high layer signaling.
  The ZP CSI-RS configuration list (refer to Table 3 and Table 4)
  The ZP CSI-RS subframe configuration ($I_{CSI-RS}$; refer to Table 5)

In the same subframe in a serving cell, the ZP CSI-RS resource and the PMCH are not configured simultaneously.

Transmission Mode (TM)

In 3GPP LTE/LTE-A systems, downlink data channel transmission mode is defined.

The following transmission mode is configured in UE through RRC signaling (e.g., an RRC connection setup message, an RRC connection reconfiguration message or an RRC connection reestablishment message).

Table 6 illustrates pieces of transmission mode if the type of RNTI masked to a PDCCH is a C-RNTI.

TABLE 6

| Transmission Mode | DCI format | Transmission method of PDSCH corresponding to PDCCH |
|---|---|---|
| Mode 1 | DCI format 1A | Single antenna port, port 0 |
|  | DCI format 1 | Single antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Large delay cyclic delay diversity (CCD) or Transmit diversity |
| Mode 4 | DCI format 1A | Transmit diversity |
|  | DCI format 2 | Closed-loop spatial multiplexing or transmit diversity |
| Mode 5 | DCI format 1A | Transmit diversity |
|  | DCI format 1D | Multi-user MIMO |
| Mode 6 | DCI format 1A | Transmit diversity |
|  | DCI format 1B | Closed-loop spatial multiplexing using single Transmission layer |
| Mode 7 | DCI format 1A | When the number of PBCH antenna ports is 1, single antenna port and port 0 are used. If not, transmit diversity |
|  | DCI format 1 | A single antenna port, port 5 |
| Mode 8 | DCI format 1A | When the number of PBCH antenna ports is 1, single antenna port and port 0 are used. If not, transmit diversity |
|  | DCI format 2B | Dual layer transmission, port 7 and 8 or single antenna port, port 7 or 8 |
| Mode 9 | DCI format 1A | A non-MBSFN subframe: when the number of PBCH antenna ports is 1, single antenna port and port 0 are used. If not, transmit diversity<br>An MBSFN subframe: single antenna port, port 7 |
|  | DCI format 2C | Multi-layer transmission, ports 7-14 or single antenna port, port 7 or 8 up to 8 layer transmission |
| Mode 10 | DCI format 1A | A non-MBSFN subframe: When the number of PBCH antenna ports is 1, single antenna port and port 0 are used. If not, transmit diversity<br>An MBSFN subframe: single antenna port, port 7 |
|  | DCI format 2D | Multi-layer transmission, ports 7-14 or single antenna port, port 7 or 8 up to 8 layer transmission |

Table 7 illustrates pieces of transmission mode if the type of RNTI masked to a PDCCH is an SPS C-RNTI.

TABLE 7

| Transmission Mode | DCI format | Transmission method of PDSCH corresponding to PDCCH |
|---|---|---|
| Mode 1 | DCI format 1A | Single antenna port, port 0 |
|  | DCI format 1 | Single antenna port, port 0 |
| Mode 2 | DCI format 1A | Transmit diversity |
|  | DCI format 1 | Transmit diversity |
| Mode 3 | DCI format 1A | Transmit diversity |
|  | DCI format 2A | Transmit diversity |
| Mode 4 | DCI format 1A | Transmit diversity |
|  | DCI format 2 | Transmit diversity |
| Mode 5 | DCI format 1A | Transmit diversity |
| Mode 6 | DCI format 1A | Transmit diversity |
| Mode 7 | DCI format 1A | Single antenna port, port 0 |
|  | DCI format 1 | Single antenna port, port 0 |
| Mode 8 | DCI format 1A | Single antenna port, port 7 |
|  | DCI format 2B | Single antenna port, port 7 or 8 |
| Mode 9 | DCI format 1A | Single antenna port, port 7 |
|  | DCI format 2C | Single antenna port, port 7 or 8 |
| Mode 10 | DCI format 1A | Single antenna port, port 7 |
|  | DCI format 2D | Single antenna port, port 7 or 8 |

Referring to Table 6 and Table 7, in the 3GPP LTE/LTE-A standards, a downlink control information (DCI) format according to the type of RNTI masked to a PDCCH has been defined. More specifically, in the case of a C-RNTI and an SPS C-RNTI, transmission mode and a DCI format corresponding to transmission mode, that is, a transmission mode-based DCI format, are defined. Furthermore, DCI format 1A applied regardless of transmission mode, that is, DCI format 1A for fall-back mode, has been defined.

In an example of an operation regarding transmission mode, if DCI format 1B is detected as a result of the blinding decoding of a PDCCH masked with a C-RNTI in Table 6, UE decodes a PDSCH assuming that the PDSCH has been transmitted according to a closed-loop spatial multiplexing scheme using a single layer.

Furthermore, in Table 6 and Table 7, transmission mode 10 means downlink data channel transmission mode of a CoMP transmission method. For example, in the case of Table 6, if DCI format 2D is detected as a result of the blind decoding of a PDCCH masked with a C-RNTI, UE decodes a PDSCH assuming that the PDSCH is transmitted according to a multi-layer transmission scheme based on antenna ports 7 to 14, that is, a DMRS. Alternatively, the UE decodes a PDSCH assuming that the PDSCH is transmitted according to a single antenna transmission scheme based on DMRS antenna port 7 or 8.

In contrast, if DCI format 1A is detected as a result of the blind decoding of a PDCCH masked with a C-RNTI, transmission mode is different depending on whether a corresponding subframe is an MBSFN subframe or not. For example, if a corresponding subframe is a non-MBSFN subframe, UE decodes a PDSCH assuming that the PDSCH has been transmitted according to single antenna transmission or a CRS-based transmit diversity scheme based on the CRS of antenna port 0. Furthermore, if a corresponding subframe is an MBSFN subframe, UE may decode a PDSCH assuming that single antenna transmission based on the DMRS of antenna port 7 has been performed.

Quasi Co-Located (QCL) Relation Between Antenna Ports

A QCL relation is described below. For example, if the large-scale property of a radio channel in which one symbol is transmitted through one antenna port may be inferred from the radio channel in which one symbol is transmitted through the other antenna port between two antenna ports, the two antenna ports may be said to be in a QCL relation (or are quasi co-located). In this case, the large-scale property includes one or more of delay spread, Doppler spread, Doppler shift, average gain, and average delay.

That is, the meaning that the two antenna ports are in the QCL relation means that the large-scale property of the radio channel from one antenna port is the same as that of a radio channel from the other antenna port. When a plurality of antenna ports in which an RS is transmitted is taken into consideration, if antenna ports in which two different types of RSs are transmitted have a QCL relation, the large-scale property of a radio channel from one type of antenna port may be substituted with the large-scale property of a radio channel from the other type of antenna port.

In accordance with the concept of QCL, UE may not assume that the same large-scale property between radio channels from corresponding antenna ports with respect to non-QCL antenna ports. That is, in this case, the UE has to perform independent processing on timing acquisition and tracking, frequency offset estimation and compensation, and delay estimation and Doppler estimation for each configured non-QCL antenna port.

In this case, there is an advantage in that UE can perform the following operation on antenna ports whose QCL may be assumed:

In relation to delay spread and Doppler spread, UE may apply the results of a power-delay profile, delay spread and Doppler spread, and Doppler spread estimation for a radio channel from one antenna port to a Wiener filter used upon channel estimation of a radio channel from the other antenna port in the same manner.

In relation to a frequency shift and receive timing, after performing time and frequency synchronization on one antenna port, UE may apply the same synchronization to the demodulation of the other antenna port.

In relation to average reception power, UE may average pieces of reference signal received power (RSRP) measurement for two or more antenna ports.

For example, if a DMRS antenna port for demodulating a downlink data channel has been subjected to QCL along with the CRS antenna port of a serving cell, UE may apply the large-scale properties of a radio channel that have been estimated from its own CRS antenna port upon channel estimation through a corresponding DMRS antenna port identically, thereby being capable of enhancing downlink data channel reception performance based on a DMRS.

The reason for this is that an estimated value regarding a large-scale property can be obtained more stably from a CRS because the CRS is a reference signal that is broadcasted with relatively high density every subframe and in the full band. In contrast, a DMRS is transmitted in UE-specific manner with respect to a specific scheduled RB. Furthermore, a valid channel received by UE may be different in a precoding resource block group (PRG) unit because the precoding matrix of a PRG unit used by a BS for transmission may be changed. Accordingly, although a plurality of PRGs has been scheduled, performance deterioration may be generated when a DMRS is used for the large-scale property of radio channel estimation over a wide band. Furthermore, a CSI-RS may also have a transmission cycle of several~several tens of ms and has low density of 1 resource element per antenna port on average per resource block. Accordingly, a CSI-RS may also experience performance deterioration if it is used for the large-scale property of radio channel estimation.

That is, UE may use a CSI-RS for the detection/reception of a downlink reference signal, channel estimation, and a channel status report through a QCL assumption between antenna ports.

Cell Measurement/Measurement Report

For one or several methods among the several methods (e.g., handover, random access, and cell search) for guaranteeing the mobility of UE, the UE reports the result of a cell measurement to an eNB (or network).

In the 3GPP LTE/LTE-A system, the cell-specific reference signal (CRS) is transmitted through 0, 4, 7 and $11^{th}$ OFDM symbols in each subframe on the time axis, and used for the cell measurement basically. That is, UE performs the cell measurement using the CRS that is received from a serving cell and a neighbor cell, respectively.

The cell measurement is the concept that includes the Radio resource management (RRM) measurement such as the Reference signal receive power (RSRP) that measures the signal strength of the serving cell and the neighbor cell or the signal strength in comparison with total reception power, and so on, the Received signal strength indicator (RSSI), the Reference signal received quality (RSRQ), and the like and the Radio Link Monitoring (RLM) measurement that may evaluate the radio link failure by measuring the link quality from the serving cell.

The RSRP is a linear average of the power distribution of the RE in which the CRS is transmitted in a measurement frequency band. In order to determine the RSRP, CRS (R0) that corresponds to antenna port '0' may be used. In addition, in order to determine the RSRP, CRS (R1) that corresponds to antenna port '1' may be additionally used. The number of REs used in the measurement frequency band and the measurement duration by UE in order to determine the RSRP may be determined by the UE within the limit that satisfies the corresponding measurement accuracy requirements. In addition, the power per RE may be determined by the energy received in the remaining part of the symbol except the CP.

The RSSI is obtained as the linear average of the total reception power that is detected from all sources including the serving cell and the non-serving cell of the co-channel, the interference from an adjacent channel, the thermal noise, and so on by the corresponding UE in the OFDM symbols including the RS that corresponds to antenna port '0'. When a specific subframe is indicated by high layer signaling for performing the RSRQ measurement, the RSSI is measured through all OFDM symbols in the indicated subframes.

The RSRQ is obtained by N×RSRP/RSSI. Herein, N means the number of RBs of the RSSI measurement bandwidth. In addition, the measurement of the numerator and the denominator in the above numerical expression may be obtained by the same RB set.

A BS may forward the configuration information for the measurement to UE through high layer signaling (e.g., RRC Connection Reconfiguration message).

The RRC Connection Reconfiguration message includes a radio resource configuration dedicated ('radioResourceConfigDedicated') Information Element (IE) and the measurement configuration ('measConfig') IE.

The 'measConfig' IE specifies the measurement that should be performed by the UE, and includes the configuration information for the intra-frequency mobility, the inter-frequency mobility, the inter-RAT mobility as well as the configuration of the measurement gap.

More specifically, the 'measConfig' IE includes 'measObjectToRemoveList' that represents the list of the measurement object ('measObject') that is to be removed from the measurement and 'measObjectToAddModList' that represents the list that is going to be newly added or amended. In addition, 'MeasObjectCDMA2000', 'MeasObjctEUTRA', 'MeasObjectGERAN' and so on are included in the 'measObject' according to the communication technique.

The 'RadioResourceConfigDedicated' IE is used to setup/modify/release the Radio Bearer, to change the MAC main configuration, to change the Semi-Persistent Scheduling (SPS) configuration and to change the dedicated physical configuration.

The 'RadioResourceConfigDedicated' IE includes the 'measSubframePattern-Serv' field that indicates the time domain measurement resource restriction pattern for serving cell measurement. In addition, the 'RadioResourceConfigDedicated' IE includes 'measSubframeCellList' indicating the neighbor cell that is going to be measured by the UE and 'measSubframePattern-Neigh' indicating the time domain measurement resource restriction pattern for neighbor cell measurement.

The time domain measurement resource restriction pattern that is configured for the measuring cell (including the serving cell and the neighbor cell) may indicate at least one subframe per radio frame for performing the RSRQ measurement. The RSRQ measurement is performed only for the subframe indicated by the time domain measurement resource restriction pattern that is configured for the measuring cell.

As described above, UE (e.g., 3GPP Rel-10) should measure the RSRQ only in the duration configured by the subframe pattern ('measSubframePattern-Serv') for the serving cell measurement and the subframe pattern ('measSubframePattern-Neigh') for the neighbor cell measurement.

Although the measurement in the pattern for the RSRQ is not limited, but it is preferable to be measured only in the pattern for the accuracy requirement.

Method for Receiving Discovery Signal

Research on techniques regarding small cell enhancement (SCE) for small cells to cover a relatively very small area using less power compared with the existing macro cells is intensively underway in order to cover the data traffic that is explosively increasing.

The small cell enhancement means a technique for enabling efficient mobility management while covering increasing traffic by densely arranging small cells in macro cell coverage (or without macro cell coverage in the case of the inside of a building) and dramatically increasing spectrum efficiency per unit area through close cooperation between a macro cell eNB and a small cell eNB or between small cell eNBs. In particular, in a certain region such as a so-called hot spot in the cell, there is a specially high communication demand, and in some regions such as cell edges or coverage holes, the reception of radio waves may be decreased, so that small cells may be utilized in the region with high demand for data services such as hot spots or communication shadow areas that is not covered by macro cells alone.

The macro cell eNB may be referred to as macro eNB (MeNB), and the small cell eNB may be referred to as small eNB, secondary eNB (SeNB).

The small cell enhancement supports the small cell on/off mechanism that maintains the on-state of the small cell only in the case that UE is existed in the small cell coverage for the energy saving of the small cell and for decreasing the interference on a neighboring cell, otherwise, that maintains the off-state of the small cell.

Since UE mobility management (e.g., handover) is performed based on the frequency (i.e., a (component) carrier or a cell) of a macro cell, connection between the UE and a network is not completely disconnected even though a part of the small cell is in the off-state.

The discovery procedure is required for the small cell in the UE to determine the on/off state.

For this, regardless of the on/off-state, the small cell is defined to transmit (i.e., broadcast) the discovery signal (or discovery reference signal; DRS) always.

Hereinafter, in the this specification, a 'discovery signal' is briefly referred to as a DRS.

In other words, a DRS is broadcasted in a predetermined period even in the case that the small cell is in the off-state. The predetermined period may assumed to be a measurement period, and may be correspond to 40 ms, 80 ms, 160 ms, and the like, for example. In this case, the small cell may maintain the on-state for broadcasting the DRS for a predetermined time (e.g., one to five subframes). For example, in the case that the measurement period is 40 ms, the DRS is broadcasted during 6 ms while the on-state being maintained, and the off-state may be maintained for the rest 34 ms.

As described above, duration for transmitting a DRS may be called a measurement window or a discovery signal occasion. That is, the discovery signal occasion includes consecutive frame durations (e.g., one to five consecutive subframe durations), and one discovery signal occasion may be existed in every measurement period.

UE performs a measurement based on the DRS that is received from a small cell, and transmits a measurement report to an eNB (or network). As described above, the eNB may recognize the small cell of the most efficient around corresponding UE by having the UE measure the DRS transmitted from the small cell and report the result to the eNB (or network) regardless of the small cell being in on/off-state. For example, as a result of the measurement result from the UE, the eNB (network) may switch the small cell that is in the off-state but has the great DRS reception power from the UE to the on-state.

In the dense small cell scenario, UE may be connected to an overlaid macro cell, and a small cell may be used for data offloading. In such a case, it is preferable that the UE discovers a lot of cells in a communication range, and the overlaid macro layer selects an optimal cell by considering not only the loading information but also other information.

In other words, the optimal cell for data offloading may not be the cell that is selected based on the RSRP/RSRQ/RSSI. But rather, the cell that has low loading or many users may be more preferable in the aspect of overall cell management. Accordingly, an advanced discovery procedure may be taken into consideration for searching more cells than being performing the existing mechanism.

The following characteristics may be taken into consideration with respect to the advanced discovery signal.

Search more cells than the legacy PSS/SSS/CRS based on cell discovery

Search cells in a time shorter than a subframe

Perform a search in a time shorter than a subframe

Support a measurement required for the fast time scale on/off operations

The following several candidates may be taken into consideration as the discovery signal for the advanced discovery algorithm.

(1) PSS/(SSS)+CRS
(2) PSS/(SSS)+CSI-RS
(3) PSS/(SSS)+PRS
(4) Or, the combination of one or more options among (1) to (3) above It is anticipated that a discovery signal may be used for the coarse time/frequency tracking, a measurement and a Quasi Co-Located (QCL) case (if it is required). Considering several purposes, the discovery signal should be designed to satisfy the following requirements.

(1) Under the assumption of very high initial timing error (e.g., ±2.5 ms), the discovery signal should support the coarse time synchronization.

(2) The discovery signal should support the adequate accuracy in a measurement.

In order to support requirements (1) and (2), it may be assumed that the PSS and/or the SSS may be transmitted.

For a simple configuration, the following limit condition may be taken into consideration for the period of the advanced discovery signal.

(1) A plurality of measurement gap periods: for example, 40 msec, 80 msec, 160 msec or 320 msec (a plurality of new measurement gap periods may be taken into consideration when a new measurement gap period is set.)

(2) DRS cycle and alignment: 10, 20, 32, 40, 64, 80, 128, 160, 256, 320, 512, 640, 1024, 1280, 2048 and 2560 (if UE may perform a measurement using the legacy signal for a serving cell, this requirement may be excluded.)

(3) When the PSS/SSS is transmitted as a discovery signal, the period of the discovery signal may be a multiple of 5 msec such that the PSS/SSS that is transmitted for the advance discovery signal may be replaced by the PSS/SSS that is transmitted in the on-state. If the discovery signal is not transmitted in the on-state, this requirement may be excluded.

In addition, in order to prevent the influence on the legacy UE, different periods from the PSS/SSS may be taken into consideration. That is, the PSS/SSS may be transmitted during the on-state, and an additional PSS/SSS may be transmitted for the discovery signal transmission. In the case that the DRS-PSS and the DRS-SSS are additionally transmitted separately from the PSS/SSS that is transmitted in the on-state, the cell ID acquired from the DRS-PSS/DRS-SSS may be different from the cell ID acquired from the PSS/SSS.

FIG. 16 is a diagram illustrating a small cell cluster/group to which an embodiment of the present invention may be applied.

As shown in FIG. 16, the "shared cell-ID scenario" means the scenario that a plurality of transmission points (TPs) in a specific (small cell) cluster/group uses the same Physical cell-ID (PCID). Even in the case that the TPs in a cluster/group use the same PCID, each of the clusters (Cluster A and Cluster B) uses different PCIDs, respectively.

In this case, the PCID may mean a Cell-specific ID that is used for transmitting the PSS/SSS and CRS like the current LTE system, or may be separate cluster/group ID that is commonly used in a specific cluster/group.

When the TPs belonged to the same cluster/group share the same PCID, the common signal (i.e., the PSS/SSS, CRS, etc. That are scrambled using the same PCID) is transmitted on the same resource from all TPs that have the same PCID.

As described above, a plurality of TPs transmits the same signal using the same resource, and accordingly, the reception signal quality may be improved and the shaded area may be prevented. In addition, since UE recognizes as if a single signal is transmitted from a single TP, the cell research or the handover is not performed by the UE for the same cluster/group, thereby the control signaling being decreased.

In order to obtain an additional cell-splitting gain between a plurality of TPs in a cluster/group, specific identification information may be added to each of the TPs. This is called a Transmission Point ID (TPID). That is, if a TP-specific signal (i.e., an RS scrambled with a TPID, etc.) is transmitted, a TP-specific signal may be transmitted independently of each TP.

For example, each TPID may be used as the sequence scrambling initialization parameter of a CSI-RS transmitted by a corresponding TP, and may also be used to transmit another TP-specific RS.

Hereinafter, in the present invention, a situation in which each TP transmits a unique TP-specific discovery signal (hereinafter, referred to as a "Discovery RS (DRS)") is taken into consideration.

A specific (small) cell transmits a DRS in a long-term cycle (e.g., 80 ms or 160 ms) even in the off state. Thus, a DRS may be configured or transmitted for UE to detect the DRS and to perform an RRM measurement report, such as RSRP.

An example in which a DRS transmitted by each TP is a CSI-RS, for convenience of a description, is described below, but the present invention is not limited thereto. That is, a CSI-RS may be used as a DRS in the same manner. A TP-specific DRS other than a CSI-RS may be defined and used in an embodiment of the present invention.

Furthermore, it is assumed that a TPID is used as the scrambling ID (SCID) of a DRS, for convenience of a description. If a TPID is different from the SCID of a DRS, it is assumed that the TPID and the SCID may be associated through high layer signaling (e.g., RRC signaling) for a relation between the TPID and the SCID.

A CSI-RS may be used for UE to perform CSI measurement and a CSI feedback report up to the 3GPP LTE Release-11 standard. A CSI-RS transmitted for such use is referred to as a "FB-CSI-RS", for convenience of a description. Furthermore, if a CSI-RS is transmitted as a TP-specific DRS, it is referred to as a "DRS-CSI-RS" different from an FB-CSI-RS, for convenience sake.

In general, a case where small cells are distributed in specific macro cell coverage and operate in a frequency (i.e., a component carrier (CC) or carrier/cell) different from that of a macro cell may be taken into consideration (e.g., small cell Scenario 2). For example, it is assumed that the frequency of a macro cell through which specific UE accesses a primary cell (PCell) is a CC1 and the frequency of neighboring small cells to be discovered by the corresponding UE is a CC2. In this case, the UE may access the corresponding small cells through a process, such as the detection of a specific discovery signal (DRS) that is intermittently transmitted by the small cell(s) and an RRM report. Furthermore, in this case, the small cells may be configured in the corresponding UE as a secondary cell (SCell) in a carrier aggregation form.

If a plurality of small cells shares the same PCID in a small cell layer, there is an advantage in that UE is connected to a single cell having large coverage. In such a scenario, overhead and number of handovers to be performed by UE can be significantly reduced. Furthermore, there is a significant advantage in that interference generated from a CRS can be reduced. However, there is a disadvantage in that ideal backhaul and strict scheduling coordination have to b satisfied for such an operation.

Accordingly, such an operation may not b always assumed and may be used only if a network can configure the operation. It may be assumed that a plurality of small cells practically maintains a single piece of virtual cell coverage, but data is transmitted only in a single cell from a viewpoint of UE. The reason why data is assumed to be transmitted only in a single cell is for obtaining advantages of a reduction of energy used due the transmission of many TPs and spatial reuse if many TPs are distributed.

In such a scenario, control data may be scheduled based on an enhanced PDCCH (EPDCCH). Furthermore, if such a cell is configured as an SCell, UE may not take into consideration the transmission of a PDCCH because it does not need to receive a common search space (CSS).

In order for such an operation to be possible, when UE detects a specific PSS/SSS, specific quasi co-located (QCL) assumption information between the corresponding synchronization signal and a DRS may be required to detect another DRS (e.g., a DRS-CRS or DRS-CSI-RS for identifying a TP) transmitted by a specific cell/TP(s) that transmits the PSS/SSS. If not, for example, if a QCL relation with any detected PSS/SSS may not be applied to detect a DRS-CSI-RS, performance deterioration may be generated in terms of detection performance and measurement accuracy of the DRS-CSI-RS itself.

A UE operation taken into consideration in an embodiment of the present invention may be illustrated as follows.

Assuming that the PCell of specific UE is a specific macro cell operating in a CC1, for example, the UE wants to detect a specific small cell/TP(s) (by a small cell search procedure) in a CC2, to access the specific small cell/TP(s) in a CA form by the addition of an SCell, and to receive a service.

To this end, a measurement object (e.g., MeasObject-EUTRA IE) for RRM measurement in the CC2 may be configured in the UE through RRC signaling (e.g., an RRC connection reconfiguration message) from a PCell. The UE attempts to detect a PSS/SSS in the CC2 based on such pieces of configuration information (e.g., PCID set information for a PSS/SSS may be provided, but when another PSS/SSS is also detected, it has to be taken into consideration as a measurement report object).

In such a situation, it is assumed that the UE has succeeded in detecting a specific PSS/SSS in the CC2 and has obtained a corresponding PCID1 based on the detected PSS/SSS. As described above, a total of 504 unique PCIDs may be represented through a combination of 3 PSSs and 168 SSSs. The UE may obtain a PCID according to a specific sequence of the PSS and SSS.

In this case, the following two scenarios may be taken into consideration depending on a network deployment.

1) Scenario 1: A non-shared cell-ID scenario in which the number of TPs that have transmitted a corresponding PSS/SSS is 1.

In the non-shared cell-ID scenario, the meaning that the number of TPs that have transmitted a corresponding PSS/SSS generated with a PCID1 is 1 may be understood as a situation in which a cell and a TP are the same (i.e., cell=TP) because a region covered by the corresponding TP is a single cell. Accordingly, it may be taken into consideration to be a scenario in which another neighboring TP transmits a separate PSS/SSS as another PCID2.

Furthermore, the corresponding TP may additionally transmit a DRS-CRS and/or a DRS-CSI-RS. In this case, the corresponding DRS-CRS and/or DRS-CSI-RS may be identically configured as the PCID1 (i.e., the DRS-CRS and/or DRS-CSI-RS are scrambled with the PCID1). In this case, a QCL relation is established between the DRS-CRS and/or DRS-CSI-RS and the PSS/SSS.

Furthermore, although the scrambling ID (SCID) and PCID1 of the DRS-CRS and/or the DRS-CSI-RS are different, a QCL assumption may be established between the PSS/SSS generated with the corresponding PCID1 and the DRS-CRS and/or the DRS-CSI-RS, and such a QCL assumption may be configured in the UE.

2) Scenario 2: A shared cell-ID scenario in which the number of TPs that have transmitted a corresponding PSS/SSS is 2 or more In the shared cell-ID scenario, the meaning that the number of TPs that transmit a corresponding PSS/SSS generated with a PCID1 is 2 or more corresponds to a meaning that a set of two or more corresponding TP may be taken into consideration to be a single cell. That is, a cell in which the corresponding PSS/SSS generated with the PCID1 is transmitted practically consists of a plurality of TPs. The PSS/SSS and a control channel may be transmitted in common by the TP set, but data transmission is separately performed by each TP, thereby being capable of obtaining a cell-splitting gain.

Furthermore, each TP may additionally transmit a separate DRS (e.g., DRS-CSI-RS). In this case, the SCID of a corresponding DRS may be independent (i.e., different) for each TP. Accordingly, each TP may transmit a separate DRS generated with an SCID independent of (or different from) the PCID1. Accordingly, in order to support UE so that the UE can detect a DRS transmitted by each TP within a cell (i.e., a set of TPs) that transmit a detected PCID1, the UE may be previously notified of the presence of a specific QCL relation between the DRS transmitted by each TP and a PSS/SSS generated with the PCID1 or the specific QCL relation should have been pre-defined in a specific form.

An embodiment of the present invention proposes a method for defining a discovery QCL type (hereinafter referred to as a "D-QCL type") that may be assumed by UE and configuring some of defined types in the UE so that UE continues to perform the detection of another DRS (e.g., a DRS-CRS and/or a DRS-CSI-RS) and RRM measurement if the UE is successful in detecting a specific PSS/SSS by taking into consideration the two network deployment scenarios.

The proposed method is described below based on a 3GPP LTE system, for convenience of a description. The range of a system to which the proposed method is applied may also be extended to other systems in addition to the 3GPP LTE system.

More specifically, the term "BS" described herein in an embodiment of the present invention is used as a comprehensive term including a remote radio head (RRH), a transmission point (TP), a reception point (RP), a relay, and an eNB (e.g., an MeNB, an SeNB, a micro eNB, a pico eNB, or a femto eNB).

Hereinafter, in an embodiment of the present invention, the number of an antenna port in which a DRS-CSI-RS is transmitted is assumed to be 201~208, for convenience of a description.

Large-scale channel properties (LSCP) in which a QCL relation is configured in each D-QCL type according to an embodiment of the present invention are described below.

A) D-QCL Type A

UE in which D-QCL Type A has been configured may assume the antenna port for the (DRS-) primary/secondary synchronization signals (and the antenna ports 0-3) and 201-(201+P-1) of a frequency carrier which are all generated with the same scrambling ID are quasi co-located with respect to some large-scale channel properties (LSCP)).

For example, if an SCID obtained using a (DRS-)PSS/SSS (and a (DRS-)CRS) detected by UE is "A", and if a DRS-CSI-RS scrambled with the same SCID "A" is present, the UE may assume that the DRS-CSI-RS and the (DRS-)PSS/SSS are quasi co-located (QCL).

In D-QCL Type A, an LSCP capable of a QCL assumption is as follows.

(1) {delay spread, Doppler spread, Doppler shift, average delay}

It may be configured (or defined/indicated) that a QCL assumption is applied between a PSS/SSS (and DRS-CRS) and a DRS-CSI-RS with respect to the LSCP of delay spread, Doppler spread, Doppler shift, and average delay.

The reason for this is that if a QCL assumption is configured or indicated by D-QCL Type A, both the PSS/SSS (and DRS-CRS) and the DRS-CSI-RS may be in the environment in which they are transmitted in the same cell/TP under a non-shared cell-ID environment.

Furthermore, if a DRS-CRS is also transmitted in a corresponding frequency, what a QCL assumption is possible with respect to only "Doppler shift, average delay" between the PSS/SSS and the DRS-CRS may be defined or configured in the UE. The reason for this is that an object to be obtained through the DRS-CRS may be cell identification/verification and thus a QCL assumption up to LSCP information may be unnecessary.

(2) {Doppler shift, average delay}

As in the PSS/SSS and DRS-CRS relation, in a DRS-CSI-RS, it may be configured (or defined/indicated) that a QCL assumption is applied between a PSS/SSS (and DRS-CRS) and a DRS-CSI-RS with respect to the LSCP of Doppler shift, average delay.

In D-QCL Type A described above, the LSCP capable of the a QCL assumption is only an example, and the present invention is not limited thereto. That is, in the previous examples, a specific LSCP may be omitted or another LSCP may be added.

In the previous description, P indicates the number of antenna ports of a DRS-CSI-RS. As described above, the antenna port number of a DRS-CSI-RS has been assumed to have the form 201, 202, . . . , but the antenna port number may have a different value (e.g., 15, 16, . . . , etc) in the same manner as a CSI-RS).

Furthermore, the antenna port number may be indicated by only the number of antenna ports. For example, if P=1, a DRS-CSI-RS antenna port whose QCL is assumed may be 201. If P=2, a DRS-CSI-RS antenna port whose QCL is assumed may be 201, 202.

Likewise, the antenna ports 0-3 are the antenna port numbers of a DRS-CRS, and the number of the antenna ports 0-3 may have a different value. Furthermore, the number of antenna ports of a DRS-CRS may be limited to 1.

As described above, QCL may be assumed between the antenna ports of a DRS-CSI-RS generated with the same SCID value as a specific SCID (e.g., PCID1) on which a (DRS-)PSS/SSS (and DRS-CRS) has been generated.

This is only one example, and the present invention is not essentially limited to the example in which a QCL assumption is possible between antenna ports according to such an SCID (e.g., PCID1). That is, the same SCID is not essentially limited to physically the same value, and may be defined or configured so that a QCL link is set up according to a one-to-one relation between pre-defined specific SCIDs.

For example, if the SCID of a detected (DRS-)PSS/SSS is a PCID1, a one-to-one relation may be established between a specific ID2 on which a measurement RS (i.e., DRS-CRS and/or DRS-CSI-RS) is generated according to a previously defined/configured specific function or table and the PCID1.

In this case, the meaning "one-to-one relation" may mean that SCIDs may have been defined in a unique pair of {PCID1, ID2}. Furthermore, an ID mapped to the PCID1 may be limited so that there is no ID other than the ID2. Alternatively, an ID mapped to the ID2 may be limited so that there is no ID other than the PCID1. As in the previous description, the PCID1 may be the same value.

As described above, in the non-shared cell-ID scenario, UE can detect a specific cell/TP (i.e., cell=TP) because D-QCL Type A has been configured in the UE.

B) D-QCL Type B

UE in which D-QCL Type B has been configured may assume the antenna ports 201-(201+P-1) with a scrambling ID of a carrier and the antenna port for the (DRS-) primary/secondary synchronization signals (and the antenna ports 0-3) with the corresponding reference scrambling ID are quasi co-located with respect to some large-scale channel properties (LSCP).

For example, if a reference SCID obtained using a (DRS-)PSS/SSS detected by UE is "A", and if a measurement RS (i.e., a DRS-CRS and/or a DRS-CSI-RS) scrambled with an SCID "B" corresponding to the reference SCID is present the UE may assume the measurement RS and the (DRS-)PSS/SSS are quasi co-located (QCL).

In D-QCL Type B, LSCPs capable of a QCL assumption may be as follows.

(1) {average delay}

It may be defined/configured so that only "average delay" or timing information is capable of a QCL assumption.

A DRS-CSI-RS may be a TP-specific RS in which only a specific TP is transmitted, and a PSS/SSS (and CRS) may be a signal (e.g., a cell-specific signal) in which a plurality of TPs is transmitted together. Accordingly, the reason for this is that it may be better in terms of performance if other LSCPs (e.g., delay spread, Doppler spread, and Doppler shift) between the RS and the signal other than average delay are configured so that a QCL assumption is incapable and independent estimation is performed based on only a DRS-CSI-RS.

In contrast, in the case of average delay, although a PSS/SSS (and CRS) is transmitted together by a plurality of TPs and a DRS-CSI-RS is transmitted by only a specific TP, help may be provided for timing synchronization through a QCL assumption because there is no problem if each estimated average delay belongs to the CP interval of an OFDM symbol.

(2) {average delay, Doppler shift}

A help is also provided to Doppler shift estimation value along with average delay through a QCL assumption upon detection and measurement of a DRS-CSI-RS. The QCL assumption may be applied to Doppler shift estimated from a PSS/SSS (and DRS-CRS) because a CSI-RS characteristic itself is relatively more vulnerable to frequency synchronization than to time synchronization. A PSS/SSS (and DRS-CRS) may be transmitted in a TP-shared form compared to a TP-specific DRS-CSI-RS, but may help performance enhancement because an object of the DRS-CSI-RS itself is limited to TP detection and RRM measurement.

(3) {average delay, Doppler shift, Doppler spread}

A help may also be provided to Doppler spread estimation value along with average delay, Doppler shift through a QCL assumption upon detection and measurement of a DRS-CSI-RS. To this end, there is a constraint condition that frequency synchronization between TPs must be performed more tightly in a network. Performance can be enhanced because a QCL assumption regarding Doppler spread estimated from a PSS/SSS (and DRS-CRS) may be applied to a DRS-CSI-RS under such an environment.

Furthermore, if a DRS-CRS is also transmitted in a corresponding frequency, it may be configured in UE or defined that a PSS/SSS and the DRS-CRS is capable of a QCL assumption with respect to "Doppler shift, average delay." The reason for this is that as described above, an object to be achieved through the DRS-CRS is cell identification/verification and a QCL assumption up to more LSCP information may be unnecessary. In this case, there may be a constraint condition (e.g., all PCID1) that the PSS/SSS and the DRS-CRS capable of a QCL assumption have the same sequence SCID.

In D-QCL Type B, LSCP capable of a QCL assumption is only an example and the present invention is not limited thereto. That is, in the previous examples, a specific LSCP may be omitted or another LSCP may be added.

In the previous description, P indicates the number of antenna ports of a DRS-CSI-RS. As described above, the antenna port number of a DRS-CSI-RS has been assumed to have the form 201, 202, . . . , but the antenna port number may have a different value (e.g., 15, 16, . . . , etc) in the same manner as a CSI-RS.

Furthermore, the antenna port number may be indicated by only the number of antenna ports. For example, if P=1, a DRS-CSI-RS antenna port whose QCL is assumed may be 201. If P=2, a DRS-CSI-RS antenna port whose QCL is assumed may be 201, 202.

Likewise, the antenna ports 0-3 are the antenna port numbers of a DRS-CRS, and the number of the antenna ports 0-3 may have a different value. Furthermore, the number of antenna ports of a DRS-CRS may be limited to 1.

As described above, a specific SCID (e.g., PCID1) on which a (DRS-) PSS/SSS has been generated corresponds to a single reference SCID. This means that one or more other DRS-CSI-RS(s) having a mapping relation with such a reference SCID may be present. That is, this means that one or more DRS-CSI-RS(s) generated with one or more SCIDs having a mapping relation with a reference SCID are present.

In this case, it may be indicated explicitly or implicitly that a PCID1 is the reference SCID so that a QCL assumption can be applied between the antenna port of a specific DRS-CSI-RS (e.g., having an ID2) and a PSS/SSS (and a DRS-CRS antenna port) generated with a corresponding PCID1.

In other words, mapping between an SCID for the DRS-CSI-RS and the reference SCID may be explicitly indicated by high layer signaling (e.g., RRC signaling) or may be implicitly indicated so that UE can directly deduce the mapping. If the mapping is implicitly indicated, for example, d and X values may be pre-defined so that the mapping is indicated in an ID2 (an SCID for a DRS-CSI-RS)=mod(PCID1+d, X) form. In this case, mod refers to a modulo operator.

As described above, in the shared cell-ID scenario, UE can detect one or more TPs (s) belonging to a specific cell and a corresponding cell because D-QCL Type B has been configured in the UE.

In the aforementioned embodiments, the D-QCL type has been described as being basically divided into two types: D-QCL Type A and D-QCL Type B. However, the present invention may also be applied to an extended embodiment, such as an embodiment in which detailed modified examples (e.g., LSCP classification), such as (1), (2), (3), . . . , illustrated according to each D-QCL type may be additionally subdivided in a separate D-QCL type and configured in UE. For example, in D-QCL Type B, an S-QCL type may be subdivided, such as that (2) of the LSCP examples capable of a QCL assumption is divided into D-QCL type C and (3) thereof is divided into D-QCL type D.

"D-QCL type", such as D-QCL Type A, B, . . . , may be configured in UE by a DRS measurement-related higher layer configuration (e.g., RRC signaling). This is described below with reference to FIG. 17.

FIG. 17 is a diagram illustrating a method for detecting a discovery signal in accordance with an embodiment of the present invention.

In FIG. 17, a CSI-RS may be identically used as a discovery signal as described above, and a TP-specific DRS may be defined and used as a discovery signal in addition to a CSI-RS.

Referring to FIG. 17, UE receives discovery QCL type configuration information for configuring a discovery QCL type (i.e., a D-QCL type) for each frequency (i.e., each component carrier (CC) or carrier/cell) from a serving eNB (TP 1) (S1701).

As described above with respect to the D-QCL type (i.e., D-QCL Type A, B), a QCL relation with an antenna port for a synchronization signal (i.e., PSS/SSS) may be configured with respect to the large-scale channel properties (LSCP) of an antenna port for a DRS (e.g., DRS-CRS and/or DRS-CSI-RS) depending on a D-QCL type configured in the UE.

For example, if a first D-QCL type (i.e., D-QCL Type A) is configured based on the discovery QCL type configuration information, the UE may assume that an antenna port for a DRS which is generated with an SCID2 which is the same (i.e., PCID) as a SCID1 (e.g., PCID) of a PSS/SSS or mapped to the SCID1 in a one-to-one manner and an antenna port for a PSS/SSS are quasi co-located (QCL).

In contrast, if a second D-QCL type (i.e., D-QCL Type B) is configured based on the discovery QCL type configuration information, the UE may assume that an antenna port for a DRS which is generated with one or more SCID2s mapped to a SCID1 (e.g., PCID) of a PSS/SSS and an antenna port for a PSS/SSS are quasi co-located (QCL).

If one or more TPs share and use the same frequency, the same D-QCL type configuration information may be applied. In contrast, if each of TPs (TP 1, TP 2, . . . , TP n) uses a different frequency (i.e., a component carrier), discovery QCL type (D-QCL type) configuration information corresponding to each TP may be transmitted.

In this case, the discovery QCL type configuration information may be transmitted through high layer signaling (e.g., RRC signaling).

For example, a single DRS measurement timing configuration (DMTC) may be configured in the UE for each frequency, and the D-QCL type configuration information may be included in the DMTC. If the D-QCL type configuration information is included in the DMTC as described above, the D-QCL type configuration information may be transmitted to the UE through an RRC connection reconfiguration message.

An example in which the D-QCL type configuration information is included in the DMTC is described in more detail below. The DMTC may include a DRS transmission cycle (e.g., 40 ms, 80 ms or 160 ms) and offset information (e.g., a subframe index, etc). In the case of UE in which a CA has been configured, the reference timing of an offset in an SCell may follow that of a PCell.

Furthermore, in addition to the DRS transmission cycle and the offset, the DMTC may include a measurement frequency band (may be assumed to the same as a system band), a measurement interval (i.e., a discovery signal occasion) (it may be assumed to be 5 ms or 6 ms if not separately configured,), the number of DRS antenna ports (it may be assumed to be 1 if not separately configured), and D-QCL type indication information (i.e., a QCL relation between a PSS/SSS (and a CRS) and a measurement RS (e.g., a DRS-CSI-RS)) (e.g., indication information indicating whether it is D-QCL Type A or D-QCL Type B).

As described above, when the DMTC is configured for each frequency, for example, whether the D-QCL type is D-QCL Type A or D-QCL Type B may be configured for each frequency.

In this case, if D-QCL Type B is configured, the DMTC may further include mapping information between an SCID (e.g., ID2) for a DRS and a reference SCID for a PSS/SSS (and a DRS-CRS antenna port) in addition to the information.

An example in which the D-QCL type has been configured by RRC signaling for the DMTC has been illustrated above, but the present invention is not limited thereto. The D-QCL type may be indicated by another RRC signaling in addition to the DMTC.

Each of the TPs (TP 1, TP 2, . . . , TP n) transmits (i.e., broadcasts) a synchronization signal (PSS/SSS) (and a cell-specific reference signal (CRS)) (S1702). Furthermore, the UE obtains the SCID of the synchronization signal (PSS/SSS) (and CRS) by detecting the synchronization signal (PSS/SSS) (and CRS) transmitted by each of the TPs (S1703).

Each of the TPs (TP 1, TP 2, . . . , TP n) transmits (i.e., broadcasts) a DRS (e.g., a DRS-CRS and/or a DRS-CSI-RS) (S1704). Furthermore, the UE detects the DRS using the SCID obtained at step S1703 based on the configured D-QCL type (S1705). That is, the UE may detect the DRS by applying an LSCP parameter obtained through the PSS/SSS (and CRS) using the QCL relation.

For example, if the first D-QCL type (i.e., D-QCL Type A) is configured based on the discovery QCL type configuration information at step S1701, the UE may detect a DRS generated with an SCID2 which is the same as the SCID1 of a PSS/SSS or mapped to the SCID1 in a one-to-one manner.

In contrast, if the second D-QCL type (i.e., D-QCL Type B) is configured based on the discovery QCL type configuration information at step S1701, the UE may detect a DRS generated with one or more SCID2s mapped (or connected) to the SCID1 (i.e., the reference SCID).

The operation (i.e., steps S1703 and S1705) of the UE according to a D-QCL type configured in the UE is described in detail below.

A) If D-QCL Type A is indicated in a corresponding frequency (e.g., the non-shared cell-ID scenario), the operation of the UE may be as follows.

The UE detects a PSS/SSS, transmitted by a specific cell, at a DMTC cycle/offset/interval indicated in the corresponding frequency. If the UE has succeeded in detecting a specific PSS/SSS (and DRS-CRS) and a corresponding SCID has been detected as a PCID1, the UE attempts to detect a DRS-CSI-RS generated with the PCID1. Furthermore, the UE performs RRM measurement and cell/TP identification based on the detected DRS-CSI-RS.

Alternatively, the UE may perform the RRM measurement and the cell/TP identification by attempting to detect a DRS-CSI-RS generated with a specific ID2 defined to be paired with the PCID1 in accordance with a previously defined/configured one-to-one mapping relation.

D-QCL Type A may be for supporting an operation in the non-shared cell-ID scenario, and thus a similar modified operation for D-QCL Type A should be construed as being included in the spirit of the present invention.

B) If D-QCL Type B is indicated in a corresponding frequency (e.g., the shared cell-ID scenario), the operation of the UE may be as follows.

The UE detects a PSS/SSS transmitted by a specific cell at a DMTC cycle/offset/interval indicated by the corresponding frequency. If the UE has succeeded in detecting a specific PSS/SSS (and DRS-CRS) and a corresponding SCID has been detected as a PCID1, the UE attempts to detect one or more DRS-CSI-RS(s) which may be connected to a PCID1 in one-to-many manner in accordance with an explicitly or implicitly indicated mapping relation. Furthermore, the UE performs RRM measurement and cell/TP identification based on the detected DRS-CSI-RS.

D-QCL Type B may be for supporting an operation in the shared cell-ID scenario, and thus a similar modified operation for D-QCL Type B should be construed as being included in the spirit of the present invention.

In addition to the method for supporting the aforementioned DRS (e.g., DRS-CRS and/or DRS-CSI-RS)-related QCL assumption, an embodiment of the present invention proposes a method for supporting PDSCH-related a QCL assumption.

Prior to a description of the method for supporting the PDSCH-related QCL assumption according to an embodiment of the present invention, PDSCH-related QCL assumption defined in 3GPP Rel-11 is first described below.

In 3GPP Rel-11, PDSCH-related QCL assumption, such as Table 8 below, is supported as a technology for a CoMP operation (refer to 3GPP TS 36.213).

TABLE 8

Antenna port quasi co-located (QCL) for PDSCH

A UE configured in transmission mode 8-10 for a serving cell may assume the antenna ports 7-14 of the serving cell are quasi co-located for a given subframe with respect to delay spread, Doppler spread, Doppler shift, average gain, and average delay.
A UE configured in transmission mode 1-9 for a serving cell may assume the antenna ports 0-3, 5, 7-22 of the serving cell are quasi co-located with respect to Doppler shift, Doppler spread, average delay, and delay spread.
A UE configured in transmission mode 10 for a serving cell is configured with one of two quasi co-location types for the serving cell by higher layer parameter qcl-Operation to decode PDSCH according to transmission scheme associated with antenna ports 7-14:
1) Type A: The UE may assume the antenna ports 0-3, 7-22 of a serving cell are quasi co-located with respect to delay spread, Doppler spread, Doppler shift, and average delay.
2) Type B: The UE may assume the antenna ports 15-22 corresponding to the CSI-RS resource configuration identified by the higher layer parameter qcl-CSI-RS-ConfigNZPId-r11 (defined in clause 7.1.9) and the antenna ports 7-14 associated with the PDSCH are quasi co-located with respect to Doppler shift, Doppler spread, average delay, and delay spread.

PDSCH-related QCL Type A, B, such as Table 8, are called PDSCH-QCL Type A, B in order to distinguish it from D-QCL Type A, B according to an embodiment of the present invention, for convenience of a description.

As in Table 8, PDSCH-QCL Type A and B are supported only in transmission mode (TM) 10. PDSCH-QCL Type A or B may be configured in UE by an RRC layer with respect to a specific frequency (i.e., a component carrier or cell/carrier).

If PDSCH-QCL Type A has been configured in UE, the UE may apply a QCL assumption between the antenna ports 0-3 (i.e., antenna ports for a CRS) and the antenna ports 7-22 (i.e., antenna ports for a CSI-RS and a DMRS) of a serving cell. This means a non-CoMP operation.

In contrast, if PDSCH-QCL Type B has been configured in UE, the UE may apply a QCL assumption between the antenna ports 7-14 (i.e., antenna ports for a DMRS) and specific antenna ports 15-22 (i.e., antenna ports for a specific CSI-RS) indicated by a higher layer parameter "qcl-CSI-RS-ConfigNZPId-r11.". This means that a CoMP operation is possible.

In accordance with an embodiment of the present invention, a PDSCH-QCL type may be defined according to the aforementioned D-QCL type.

First, in the case of UE in which D-QCL Type A has been configured in a corresponding frequency by specific high layer signaling, such as a DMTC, for example, when a specific PSS/SSS (and DRS-CRS) generated with a PCID1 is detected, a PDSCH-QCL type to be applied to a corresponding cell by the UE (when TM 10 is set in the UE) (e.g., when a corresponding cell is the ON-state), PDSCH-QCL Type A may be configured basically (or by default). Accordingly, the UE performs a QCL assumption according to PDSCH-QCL Type A, that is, the basic configuration, unless PDSCH-QCL Type B is subsequently reconfigured in the UE by high layer signaling (e.g., RRC signaling), and performs an operation, such as data reception from the corresponding serving cell. That is, the UE performs a non-CoMP operation in TM 10.

In contrast, if D-QCL Type B has been configured in UE in a corresponding frequency through a specific higher layer configuration, such as a DMTC, for example, when a specific PSS/SSS (and DRS-CRS) generated with a PCID1 is detected, a PDSCH-QCL type to be applied to a corresponding cell (e.g., if a corresponding cell is the ON-state) by UE (when TM 10 is set in the UE) may be basically configured to be PDSCH-QCL Type B. Accordingly, the UE performs a QCL assumption according to PDSCH-QCL Type B, that is, the basic configuration, unless PDSCH-QCL Type A is subsequently reconfigured by high layer signaling (e.g., RRC signaling), and performs an operation, such as data reception from the corresponding serving cell. That is, the UE performs a CoMP operation in TM 10.

In this case, multiple NZP CSI-RS configurations, CSI-IM configurations, and CSI processing configurations for supporting the CoMP operation may be configured by RRC signaling when the corresponding serving cell is added as an SCell.

In a conventional technology, PDSCH-QCL Type A has always been basically configured. However, an embodiment of the present invention has an advantage in that a CoMP operation can be rapidly supported without a process for setting PDSCH-QCL Type A to PDSCH-QCL Type B again because PDSCH-QCL Type B is basically configured in UE as described above.

Furthermore, referring back to Table 8, in 3GPP Rel-11, UE in which pieces of transmission mode 1-9 have been set in relation to a serving cell may assume that the antenna ports 0-3, 5, and 7-22 of the serving cell have been quasi co-located (QCL) with respect to Doppler shift, Doppler spread, average delay, and delay spread.

In accordance with an embodiment of the present invention, a QCL assumption may be configured as in Table 9 with respect to UE in which the pieces of transmission mode 1-9 have been set.

The PDSCH-QCL type of UE in which the pieces of transmission mode 1-9 have been set are called PDSCH-TM1-9-QCL Type A, B in order to distinguish it from the above PDSCH-QCL type, for convenience of a description. This is only an example and PDSCH-QCL Type A and B may be integrated and defined. That is, the PDSCH-QCL types of TM 1-9 and TM 10 may be integrated and defined.

TABLE 9

A UE configured in transmission mode 1-9 for a serving cell is configured with one of two PDSCH-TM1-9-QCL types for the serving cell by higher layer parameter qcl-

TABLE 9-continued

OperationTM1-9 to decode PDSCH according to transmission scheme associated with antenna ports 0-3, 5, or 7-14.
1) PDSCH-TM1-9-QCL type A:
The UE may assume the antenna ports 0-3, 5, 7-22 of the serving cell are quasi co-located with respect to Doppler shift, Doppler spread, average delay, and delay spread.
2) PDSCH-TM1-9-QCL type B:
The UE configured with DMRS-based PDSCH transmission mode (e.g., TM9) may assume the antenna ports 15-22 (corresponding to the DRS-CSI-RS antenna ports 201-208 (with the same scrambling ID)) and the DMRS-related antenna ports (e.g., 7-14) associated with the PDSCH are quasi co-located with respect to Doppler shift, Doppler spread, average delay, and delay spread.
UE shall not assume the antenna ports 0-3 and other CSI-RS/DMRS antenna ports are quasi co-located, due to the shared cell-ID scenario.
The UE configured with CRS-based PDSCH transmission mode (e.g., TM4) shall not assume the antenna ports 0-3 and other CSI-RS/DMRS antenna ports, due to the shared cell-ID scenario.

In accordance with an embodiment of the present invention, a PDSCH-TM1-9-QCL type may be determined based on the D-QCL type.

First, if D-QCL Type A is configured in UE in a corresponding frequency through specific high layer signaling, such as a DMTC, for example, when a specific PSS/SSS (and DRS-CRS) generated with a PCID1 is detected, a PDSCH-TM1-9-QCL type to be applied to a corresponding cell (e.g., when the corresponding cell is the ON-state) may be configured as PDSCH-TM1-9-QCL Type A basically (or by default) in UE (when TM 1-9 is configured in the UE). Accordingly, the UE performs a QCL assumption according to PDSCH-TM1-9-QCL Type A, that is, the basic configuration, unless PDSCH-TM1-9-QCL Type B is subsequently reconfigured by high layer signaling (e.g., RRC signaling), and performs an operation, such as data reception from the corresponding cell.

In contrast, if D-QCL Type B is configured in UE in a corresponding frequency through specific high layer signaling, such as a DMTC, for example, when a specific PSS/SSS (and DRS-CRS) generated with a PCID1 is detected, a PDSCH-TM1-9-QCL type to be applied (e.g., when a corresponding cell is the ON-state) to the corresponding cell by UE (when TM 1-9 is configured in the UE) may be basically configured as PDSCH-TM1-9-QCL Type B. Accordingly, the UE performs a QCL assumption and performs an operation, such as data reception from the corresponding cell, according to PDSCH-TM1-9-QCL Type B, that is, the basic configuration, unless PDSCH-TM1-9-QCL Type A is subsequently reconfigured by high layer signaling (e.g., RRC signaling).

As a result, in a cell that transmits a PSS/SSS generated with a PCID1 detected in a frequency configured as D-QCL Type A (e.g., the non-shared cell-ID scenario), a QCL operation, such as that of a conventional technology, may be applied to UE although TM 1-9 is configured in the UE. That is, in 3GPP Rel-11, a QCL assumption for UE in which TM 1-9 has configured UE is the same.

In contrast, in a cell that transmits a PSS/SSS generated with a PCID1 detected in a frequency configured as D-QCL Type B (e.g., the shared cell-ID scenario), in the case of UE that detects a DRS-CSI-RS transmitted by each of (multiple) TP(s) within the corresponding cell, a QCL assumption should not be established between a TP-specific CSI-RS for feedback transmitted in the ON-state and a cell-specific and shared (CRS) TP(s) transmitted by the corresponding cell with an explicit or implicit mapping relation with a corresponding DRS-CSI-RS from the corresponding TP in order to correctly configure a QCL assumption in the UE.

In other words, if the technology proposed according to an embodiment of the present invention is not applied, when a cell and TP detected in a frequency configured as D-QCL Type B (e.g., the shared cell-ID scenario) are present, a conventional technology may have a problem in the data reception of UE because a QCL relation is always assumed in all of the antenna ports of a CRS/CSI-RS/DMRS as in PDSCH QCL Type A although the UE wants to receive a service according to a TP-specific CSI-RS and DMRS from the corresponding TP.

Accordingly, in this case, there is an advantage in that a TP-specific operation is made possible because PDSCH-TM1-9-QCL Type B described above is configured to be applied to corresponding UE. Furthermore, the basic QCL operation is configured or defined so that the basic PDSCH-TM1-9-QCL type is A in the case of D-QCL Type A and the basic PDSCH-TM1-9-QCL type is B in the case of D-QCL Type B. Accordingly, there is an advantage in that a service can be started even without a separate reconfiguration (e.g., by RRC signaling) because a preferably expected operation is defined as a basic type.

General Device to which Embodiment of the Present Invention May be Applied

FIG. 18 illustrates a block diagram of a wireless communication device according to an embodiment of the present invention.

Referring to FIG. 18, the wireless communication system includes a BS 1810 and a plurality of pieces of UE 1820 located with coverage of the BS 1810.

The BS 1810 includes a processor 1811, memory 1812, and a radio frequency (RF) unit 1813. The processor 1811 implements the functions, processes and/or methods proposed in FIGS. 1 to 17. The layers of a radio interface protocol may be implemented by the processor 1811. The memory 1812 is connected to the processor 1811, and stores a variety of types of information for driving the processor 1811. The RF unit 1813 is connected to the processor 1811 and transmits and/or receives a radio signal.

The UE 1820 includes a processor 1821, memory 1822, and an RF unit 1823. The processor 1821 implements the functions, processes and/or methods proposed in FIGS. 1 to 17. The layers of a radio interface protocol may be implemented by the processor 1821. The memory 1822 is connected to the processor 1821, and stores a variety of types of information for driving the processor 1821. The RF unit 1823 is connected to the processor 1821 and transmits and/or receives a radio signal.

The memory 1812, 1822 may be located inside or outside the processor 1811, 1821 and may be connected to the processor 1811, 1821 by various well-known means. Furthermore, the BS 1810 and/or the UE 1820 may have a single antenna or multiple antennas.

In the aforementioned embodiments, the elements and characteristics of the present invention have been combined in specific forms. Each of the elements or characteristics may be taken into consideration to be optional unless otherwise described explicitly. Each of the elements or characteristics may be implemented in such a way as to be not combined with other elements or characteristics. Furthermore, some of the elements and/or the characteristics may be combined to form an embodiment of the present invention. The order of the operations described in connection with the embodiments of the present invention may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

An embodiment of the present invention may be implemented by various means, for example, hardware, firmware, software or a combination of them. In the case of implementations by hardware, an embodiment of the present invention may be implemented using one or more Application-Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers and/or microprocessors.

In the case of an implementation by firmware or software, an embodiment of the present invention may be implemented in the form of a module, procedure, or function for performing the aforementioned functions or operations. Software code may be stored in memory and driven by a processor. The memory may be located inside or outside the processor, and may exchange data with the processor through a variety of known means.

It is evident to those skilled in the art that the present invention may be materialized in other specific forms without departing from the essential characteristics of the present invention. Accordingly, the detailed description should not be construed as being !imitative from all aspects, but should be construed as being illustrative. The scope of the present invention should be determined by reasonable analysis of the attached claims, and all changes within the equivalent range of the present invention are included in the scope of the present invention.

INDUSTRIAL APPLICABILITY

The method for receiving a discovery signal in a wireless communication system according to an embodiment of the present invention has been illustrated based on an example in which the method is applied to 3GPP LTE/LTE-A systems, but may be applied to various wireless communication systems in addition to the 3GPP LTE/LTE-A systems.

What is claimed is:

1. A method for receiving, by user equipment, a discovery signal in a wireless communication system, the method comprising:
  receiving discovery QCL type configuration information for configuring a discovery quasi co-located (QCL) type;
  obtaining a first scrambling identity (SCID) by detecting a synchronization signal; and
  detecting the discovery signal using the first SCID based on the configured discovery QCL type,
  wherein the discovery signal is generated based on a second SCID corresponding to the first SCID, and
  wherein a QCL relation is configured between an antenna port for the discovery signal and an antenna port for the synchronization signal with respect to a large-scale channel property based on the discovery QCL type.

2. The method of claim 1, wherein if the first discovery QCL type is configured based on the discovery QCL type configuration information,
  the user equipment assumes that the antenna port for the discovery signal which is generated with the second SCID identical with the first SCID or mapped in a one-to-one manner and the antenna port for the synchronization signal are quasi co-located (QCL).

3. The method of claim 2, wherein the user equipment detects the discovery signal generated with the second SCID which is identical with the first SCID or mapped in a one-to-one manner.

4. The method of claim 2, wherein the large-scale channel property comprises any one of {Doppler shift, average delay} and {delay spread, Doppler spread, Doppler shift, average delay}.

5. The method of claim 2, wherein the user equipment assumes that the antenna port for the synchronization signal and an antenna port for a cell-specific reference signal are quasi co-located (QCL) with respect to Doppler shift and average delay.

6. The method of claim 2, wherein the user equipment assumes that all of an antenna port for a cell-specific reference signal, an antenna port for a demodulation reference signal, and an antenna port for a channel state information reference signal are quasi co-located (QCL).

7. The method of claim 2, wherein if a second discovery QCL type is configured based on the discovery QCL type configuration information,
  the user equipment assumes that the antenna port for the discovery signal which is generated with one or more second SCIDs mapped to the first SCID and the antenna port for the synchronization signal are quasi co-located (QCL).

8. The method of claim 7, wherein the user equipment detects the discovery signal generated with the one or more second SCIDs mapped to the first SCID.

9. The method of claim 8, wherein the mapping between the first SCID and the second SCIDs is configured by a network or implicitly determined by a predetermined function or table.

10. The method of claim 7, wherein the large-scale channel property comprises any one of {average delay}, {average delay, Doppler shift}, and {average delay, Doppler shift, Doppler spread}.

11. The method of claim 7, wherein the user equipment assumes that the antenna port for the synchronization signal and an antenna port for a cell-specific reference signal are quasi co-located (QCL) with respect to Doppler shift and average delay.

12. The method of claim 7, wherein if the user equipment supports a coordinated multi-point transmission and reception (CoMP) operation,
  the user equipment assumes that an antenna port for a channel state information reference signal indicated by a higher layer parameter and an antenna port for a demodulation reference signal are quasi co-located (QCL).

13. The method of claim 7, wherein if physical downlink shared channel (PDSCH) transmission mode based on a demodulation reference signal (DMRS) has been configured in the user equipment,
the user equipment assumes that an antenna port for a channel state information reference signal and an antenna port for the DMRS are quasi co-located (QCL).

14. The method of claim 7, wherein if physical downlink shared channel (PDSCH) transmission mode based on a cell-specific reference signal (CRS) has been configured in the user equipment,
the user equipment assumes that an antenna port for the CRS and antenna ports for a channel state information reference signal and a demodulation reference signal are not quasi co-located (QCL).

15. User equipment receiving a discovery signal in a wireless communication system, the user equipment comprising:
a radio frequency (RF) unit transceiving a radio signal; and
a processor controlling the user equipment,
wherein the processor is configured to:
receive discovery QCL type configuration information for configuring a discovery quasi co-located (QCL) type;
obtain a first scrambling identity (SCID) by detecting a synchronization signal; and
detect the discovery signal using the first SCID based on the configured discovery QCL type,
wherein the discovery signal is generated based on a second SCID corresponding to the first SCID, and
wherein a QCL relation is configured between an antenna port for the discovery signal and an antenna port for the synchronization signal with respect to a large-scale channel property based on the discovery QCL type.

* * * * *